(12) United States Patent
Zhang et al.

(10) Patent No.: US 11,228,442 B2
(45) Date of Patent: *Jan. 18, 2022

(54) AUTHENTICATION METHOD, AUTHENTICATION APPARATUS, AND AUTHENTICATION SYSTEM

(71) Applicant: Huawei Technologies Co., Ltd., Shenzhen (CN)

(72) Inventors: Bo Zhang, Shenzhen (CN); Lu Gan, Shenzhen (CN); Yanjiang Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/923,741

(22) Filed: Jul. 8, 2020

(65) Prior Publication Data

US 2020/0344063 A1 Oct. 29, 2020

Related U.S. Application Data

(63) Continuation of application No. 16/291,954, filed on Mar. 4, 2019, now Pat. No. 10,742,418, which is a
(Continued)

(30) Foreign Application Priority Data

Sep. 5, 2016 (CN) .......................... 201610803439.7

(51) Int. Cl.
*H04L 29/06* (2006.01)
*H04L 9/32* (2006.01)
(Continued)

(52) U.S. Cl.
CPC .......... *H04L 9/3242* (2013.01); *H04L 9/0838* (2013.01); *H04L 9/0844* (2013.01);
(Continued)

(58) Field of Classification Search
CPC ... H04L 9/3242; H04L 9/3271; H04L 9/3273; H04L 9/0838; H04L 9/0844;
(Continued)

(56) References Cited

U.S. PATENT DOCUMENTS 8,457,313 B2 6/2013 Zaus
8,458,468 B2 * 6/2013 Leone ................ H04L 63/0869
713/168
(Continued)

FOREIGN PATENT DOCUMENTS

CN 101719895 A 6/2010
CN 102624528 A 8/2012
(Continued)

OTHER PUBLICATIONS

Boneh,"Identity-Based Encryption from the Weil Pairing," Crypto, Lecture Notes in Computer Science 2139, pp. 213-229, Springer-Verlag Berlin Heidelberg (2001).
(Continued)

*Primary Examiner* — Hosuk Song
(74) *Attorney, Agent, or Firm* — Leydig, Voit & Mayer, Ltd.

(57) ABSTRACT

An authentication method, an authentication apparatus, and an authentication system for the communications field are described. The authentication includes receiving, by a communications network element, a request from a user equipment (UE) comprising a first identifier that is an international mobile subscriber identity (IMSI). The communication network element, in response to the request, sends the first identifier to a home subscriber server. The communications network element, upon authenticating the UE successfully, sends a second identifier to a key management center (KMS) to facilitate the KMS generating a subscriber private key corresponding to the second identifier
(Continued)

and sending the subscriber private key to the communications network element. The communications network element thereafter sends the subscriber private key to the UE.

20 Claims, 15 Drawing Sheets

Related U.S. Application Data continuation of application No. PCT/CN2017/092840, filed on Jul. 13, 2017.

(51) Int. Cl.
*H04L 9/08* (2006.01)
*H04W 12/06* (2021.01)

(52) U.S. Cl.
CPC .......... *H04L 9/0866* (2013.01); *H04L 9/3247* (2013.01); *H04L 9/3273* (2013.01); *H04L 63/061* (2013.01); *H04L 63/0869* (2013.01); *H04W 12/06* (2013.01); *H04L 2209/80* (2013.01)

(58) Field of Classification Search
CPC ... H04L 9/0866; H04L 9/0869; H04L 9/3247; H04L 63/061; H04L 63/08; H04L 63/0869; H04L 2209/80; H04W 12/06
See application file for complete search history.

(56) References Cited

U.S. PATENT DOCUMENTS

| | | |
|---|---|---|
| 8,595,501 B2 | 11/2013 | Rose et al. |
| 8,683,564 B2 * | 3/2014 | Khan .................... H04L 9/3271 726/6 |
| 9,037,112 B2 * | 5/2015 | Rajadurai ............. H04W 8/265 455/411 |
| 9,332,000 B2 | 5/2016 | Lei et al. |
| 9,439,072 B2 | 9/2016 | Moon et al. |
| 9,813,400 B2 | 11/2017 | Ross et al. |
| 9,871,785 B1 | 1/2018 | Triandopoulos et al. |
| 10,423,950 B2 * | 9/2019 | Staflin .................... H04L 63/08 |
| 10,742,418 B2 * | 8/2020 | Zhang .................. H04L 9/3247 |
| 10,887,295 B2 * | 1/2021 | Muhanna ............ H04W 12/041 |
| 2003/0115464 A1 | 6/2003 | Nyang et al. |
| 2009/0228705 A1 | 9/2009 | Cho et al. |
| 2012/0023334 A1 | 1/2012 | Brickell et al. |
| 2013/0191638 A1 | 7/2013 | Spector et al. |
| 2013/0297939 A1 | 11/2013 | Sundaram |

FOREIGN PATENT DOCUMENTS

| | | |
|---|---|---|
| CN | 103634115 A | 3/2014 |
| CN | 102318258 B | 8/2015 |
| WO | 2012112124 A1 | 8/2012 |

OTHER PUBLICATIONS

Groves "MIKEY-SAKKE: Sakai-Kasahara Key Encryption in Multimedia Internet KEYing (MIKEY)", Request for Comments 6509, ISSN: 2070-1721, Internet Engineering Task Force, Reston, Virginia (Feb. 2012).

"3rd Generation Partnership Project; Technical Specification Group Services and System Aspects; Proximity-based Services (ProSe); Security aspects(Release 13)," 3GPP TS 33.303 V13.4.0, pp. 1-89, 3rd Generation Partnership Project, Valbonne, France (Jun. 2016).

* cited by examiner

AUTHENTICATION METHOD, AUTHENTICATION APPARATUS, AND AUTHENTICATION SYSTEM

CROSS-REFERENCE TO RELATED APPLICATIONS

This application is a continuation of U.S. application Ser. No. 16/291,954, filed on Mar. 4, 2019, which is a continuation of International Application No. PCT/CN2017/092840, filed on Jul. 13, 2017, which claims priority to Chinese Application No. 201610803439.7, filed on Sep. 5, 2016. All of the afore-mentioned patent applications are hereby incorporated by reference in their entireties.

TECHNICAL FIELD

The present invention relates to the communications field, and in particular, to an authentication method, an authentication apparatus, and an authentication system.

BACKGROUND

A future mobile communications network includes various services, where the services have different security requirements. A future mobile communications network has a key center, which can control and manage generation and distribution of keys, to satisfy security requirements of services.

However, the following problem occurs if a 2G/3G/4G security protection mode continues to be used: Because all root keys are stored on a core node, that is, a home subscriber server (HSS), an authentication flexibility requirement of a service cannot be satisfied. If authentication of mass devices all requires participation of the HSS, system complexity is increased.

Therefore, in view of a security requirement of a future service, a more flexible authentication manner needs to be designed to satisfy an authentication flexibility requirement of a service.

SUMMARY

Embodiments of the present invention provide an authentication method, an authentication apparatus, and an authentication system, to satisfy an authentication flexibility requirement of a service.

According to a first aspect, an authentication method is provided. The method includes:

sending, by first user equipment, a first random parameter to second user equipment;

obtaining, by the second user equipment, a first user identifier, a second user identifier, and a second random parameter, generating a second authentication feature based on the first user identifier, the second user identifier, the first random parameter, and the second random parameter, and sending the second authentication feature to the first user equipment;

attempting to authenticate, by the first user equipment, correctness of the second authentication feature, generating a first authentication feature, and sending the first authentication feature to the second user equipment; and attempting to authenticate, by the second user equipment, correctness of the first authentication feature.

In the authentication method performed between two user equipments provided in the embodiments of the present invention, in an authentication process, participation of an HSS is not required, so that an authentication flexibility requirement of a service can be satisfied.

In this embodiment of the present invention, the first user equipment and the second user equipment may be various terminal devices including, but not limited to, mobile phones, computers, smart televisions, intelligent refrigerators, and the like.

In this embodiment of the present invention, the second user equipment may obtain the first user identifier, the second user identifier, and the second random parameter in various different manners. In an obtaining manner, the second user equipment receives the first user identifier and the second user identifier from the first user equipment, and randomly generates the second random parameter. In another obtaining manner, the second user equipment obtains the first user identifier and the second user identifier in advance, for example, obtains the first user identifier and the second user identifier in a key distribution stage, and randomly generates the second random parameter.

In this embodiment of the present invention, the authentication feature may be a message authentication code (MAC), a ciphertext, or a digital signature. The following separately further describes these three cases.

In a case, the authentication feature is a MAC. In this case, after a second MAC is generated, the authentication method may further include:

sending, by the second user equipment, the first random parameter and the second random parameter to the first user equipment; and the generating, by the first user equipment, a first authentication feature includes: generating, by the first user equipment, the first MAC based on the first random parameter and the second random parameter.

The first user equipment receives the first random parameter and the second random parameter, so that the first MAC can be conveniently calculated based on the first random parameter and the second random parameter.

When the authentication feature is a MAC, correspondingly, the generating a second MAC may include:

generating a communication shared key (K_com) and/or a session key (K_session) based on the first user identifier and the second user identifier; and generating the second MAC based on the communication shared key (K_com) or the session key (K_session), the first random parameter, and the second random parameter.

K_com=H (e(xH(ID1), H(ID2))^{H (parameter 1)}), where the parameter 1 may be at least one of a service identifier, a slice identifier, a link identifier, a connection identifier, a session identifier, a serving network identifier, a public land mobile network identifier, the first user identifier, and the second user identifier, and the H( ) algorithm is a Hash( ) algorithm or a hash-based message authentication code (HMAC( )) algorithm;

K_session=KDF (K_com, (at least one of session identifier, first random parameter, second random parameter, service identifier, first user identifier, and second user identifier)); and the second MAC=MAC (K_com or K_session, (at least one of first random parameter and second random parameter), (at least one of session identifier, first user identifier, second user identifier, service identifier, slice identifier, link identifier, connection identifier, serving network identifier, and public land mobile network identifier)), where the session identifier, the service identifier, the slice identifier, the link identifier, the connection identifier, the serving network identifier, and the public land mobile network identifier are obtained by the second user equipment in advance.

When the authentication feature is a MAC, correspondingly, the generating the first MAC may include:

obtaining, by the first user equipment, the first user identifier and the second user identifier, and generating a communication shared key (K_com) and/or a session key (K_session) based on the first user identifier and the second user identifier; and generating the first MAC based on the communication shared key (K_com) or the session key (K_session), the first random parameter, and the second random parameter, where K_com=H (e(xH(ID1), H(ID2))^{H (parameter 1)}), where the parameter 1 may be at least one of a service identifier, a slice identifier, a link identifier, a connection identifier, a session identifier, a serving network identifier, a public land mobile network identifier, the first user identifier, and the second user identifier, and the H( ) algorithm is a Hash( ) algorithm or an HMAC( ) algorithm;

K_session=KDF (K_com, (at least one of session identifier, first random parameter, second random parameter, service identifier, first user identifier, and second user identifier)); and the first MAC=MAC (K_com or K_session, (at least one of first random parameter and second random parameter), (at least one of session identifier, first user identifier, second user identifier, service identifier, slice identifier, link identifier, connection identifier, serving network identifier, and public land mobile network identifier)), where the session identifier, the service identifier, the slice identifier, the link identifier, the connection identifier, the serving network identifier, and the public land mobile network identifier are obtained by the first user equipment in advance.

The foregoing manner is a new MAC generation manner, and authentication between user equipments can be performed by using the generated MAC.

In another case, the authentication feature is a ciphertext, and the generating a second authentication feature based on the first user identifier, the second user identifier, the first random parameter, and the second random parameter may include:

encrypting the first user identifier, the second user identifier, the first random parameter, and the second random parameter by using the first user identifier, a communication shared key (K_com), or a session key (K_session), to generate a second ciphertext; and the attempting to authenticate, by the first user equipment, correctness of the second authentication feature includes: decrypting, by the first user equipment, the second ciphertext by using a first subscriber key, the communication shared key (K_com), or the session key (K_session), to obtain a first random parameter and a second random parameter, and determining whether the first random parameter obtained by decryption is the same as the first random parameter previously sent to the second user equipment, where if the first random parameter obtained by decryption is the same as the first random parameter previously sent to the second user equipment, authentication succeeds, where the key used in encryption corresponds to the key used in decryption;

K_com=e(xH(ID1), H(ID2)), K_com=H (e(xH(ID1), H(ID2)), or K_com=H (e(xH(ID1), H(ID2))^{H (parameter 1)}), where the parameter 1 may be at least one of a service identifier, a slice identifier, a link identifier, a connection identifier, a session identifier, a serving network identifier, a public land mobile network identifier, the first user identifier, and the second user identifier, and the H( ) algorithm is a Hash( ) algorithm or an HMAC( ) algorithm; and K_session=KDF (K_com, (at least one of session identifier, first random parameter, second random parameter, service identifier, first user identifier, and second user identifier)).

In the foregoing manner of authenticating the second ciphertext, matching between the first random parameter obtained by decryption and the first random parameter previously sent to the second user equipment is performed, to authenticate whether the first random parameter changes, thereby better authenticating the second user equipment.

When the authentication feature is a ciphertext, correspondingly, the generating a first authentication feature includes:

obtaining, by the first user equipment, the first user identifier and the second user identifier, and encrypting the first user identifier, the second user identifier, and the second random parameter by using the first user identifier, the communication shared key (K_com), or the session key (K_session), to generate a first ciphertext; and the attempting to authenticate, by the second user equipment, correctness of the first authentication feature includes:

decrypting, by the second user equipment, the first ciphertext by using the first subscriber key, the communication shared key (K_com), or the session key (K_session), to obtain a second random parameter, and determining whether the second random parameter obtained by decryption is the same as the previously encrypted second random parameter, where if the second random parameter obtained by decryption is the same as the previously encrypted second random parameter, authentication succeeds.

In the foregoing manner of authenticating the first ciphertext, matching between the second random parameter obtained by decryption and the second random parameter previously sent to the first user equipment is performed, to authenticate whether the second random parameter changes, thereby better authenticating the first user equipment.

When the authentication feature is a ciphertext, optionally, the first random parameter sent by the first user equipment to the second user equipment is an encrypted first random parameter. Correspondingly, the authentication method may further include: decrypting, by the second user equipment, the encrypted first random parameter to obtain the first random parameter.

An encryption manner may include encryption based on the communication shared key (K_com) and encryption based on an identifier. The first random parameter is encrypted, to better ensure security of the first random parameter.

In another case, the authentication feature is a digital signature. Correspondingly, after a second digital signature is generated, the method may further include:

sending, by the second user equipment, the first random parameter and the second random parameter to the first user equipment; and the generating, by the first user equipment, a first authentication feature includes: generating, by the first user equipment, the first digital signature based on the first random parameter and the second random parameter.

When the authentication feature is a digital signature, optionally, the generating a second authentication feature may include:

the second digital signature=Sign (SK_ID2, (at least one of first random parameter and second random parameter), (at least one of session identifier, first user identifier, second user identifier, service identifier, slice identifier, link identifier, connection identifier, serving network identifier, and public land mobile network identifier)); and when the authentication feature is a digital signature, the generating a first authentication feature may include:

a first digital signature=Sign (SK_ID1, (at least one of first random parameter and second random parameter), (at least one of session identifier, first user identifier, second user identifier, service identifier, slice identifier, link identifier, connection identifier, serving network identifier, and public land mobile network identifier)); and SK_ID1 is a first subscriber key, SK_ID2 is a second subscriber key, and the session identifier, the service identifier, the slice identifier, the link identifier, the connection identifier, the serving network identifier, and the public land mobile network identifier may be obtained by the second user equipment in advance.

The foregoing provides a new digital signature generation manner, and mutual authentication based on the digital signature can be subsequently conveniently performed.

When the authentication feature is a digital signature, optionally, after the attempting to authenticate, by the second user equipment, correctness of the first authentication feature, the authentication method may further include:

encrypting session communication between the first user equipment and the second user equipment by using a communication shared key (K_com) or a session key (K_session), where K_com=H (e(xH(ID1), H(ID2))^{H (parameter 1)}), where the parameter 1 may be at least one of a service identifier, a slice identifier, a link identifier, a connection identifier, a session identifier, a serving network identifier, a public land mobile network identifier, the first user identifier, and the second user identifier, and the H( ) algorithm is a Hash( ) algorithm or an HMAC( ) algorithm; and K_session=KDF (K_com, (at least one of session identifier, first random parameter, second random parameter, service identifier, first user identifier, and second user identifier)), where the session identifier, the service identifier, the slice identifier, the link identifier, the connection identifier, the serving network identifier, and the public land mobile network identifier are obtained by the second user equipment in advance.

Session communication is encrypted by using the communication shared key (K_com) or the session key (K_session), to better ensure security of a session between two terminals.

According to a second aspect, another authentication method is provided. The method includes:

sending, by first user equipment, a first random parameter to second user equipment;

receiving, by the first user equipment, a second authentication feature from the second user equipment; and attempting to authenticate, by the first user equipment, correctness of the second authentication feature, generating a first authentication feature, and sending the first authentication feature to the second user equipment.

In a case, the authentication feature is a message authentication code (MAC). In this case, before the first authentication feature is generated, the method further includes:

receiving, by the first user equipment, the first random parameter and a second random parameter from the second user equipment; and correspondingly, the generating a first authentication feature includes:

obtaining, by the first user equipment, the first user identifier and the second user identifier, and generating a communication shared key (K_com) and/or a session key (K_session) based on the first user identifier and the second user identifier; and generating, by the first user equipment, a first MAC based on the communication shared key (K_com) or the session key (K_session), the first random parameter, and the second random parameter, where K_com=H (e(xH(ID1), H(ID2))^{H (parameter 1)}), where the parameter 1 may be at least one of a service identifier, a slice identifier, a link identifier, a connection identifier, a session identifier, a serving network identifier, a public land mobile network identifier, the first user identifier, and the second user identifier, and the H( ) algorithm is a Hash( ) algorithm or an HMAC( ) algorithm;

K_session=KDF (K_com, (at least one of session identifier, first random parameter, second random parameter, service identifier, first user identifier, and second user identifier)); and the first MAC=MAC (K_com or K_session, (at least one of first random parameter and second random parameter), (at least one of session identifier, first user identifier, second user identifier, service identifier, slice identifier, link identifier, connection identifier, serving network identifier, and public land mobile network identifier)), where the session identifier, the service identifier, the slice identifier, the link identifier, the connection identifier, the serving network identifier, and the public land mobile network identifier are obtained by the first user equipment in advance or received from the first user equipment.

In a case, the authentication feature is a ciphertext. In this case, the attempting to authenticate, by the first user equipment, correctness of the second authentication feature includes:

decrypting, by the first user equipment, a second ciphertext by using a first subscriber key, a communication shared key (K_com), or a session key (K_session), to obtain a first random parameter and a second random parameter, and determining whether the first random parameter obtained by decryption is the same as the first random parameter previously sent to the second user equipment, where if the first random parameter obtained by decryption is the same as the first random parameter previously sent to the second user equipment, authentication succeeds, where K_com=e(xH(ID1), H(ID2)), K_com=H (e(xH(ID1), H(ID2)), or K_com=H (e(xH(ID1), H(ID2))^{H (parameter 1)}), where the parameter 1 may be at least one of a service identifier, a slice identifier, a link identifier, a connection identifier, a session identifier, a serving network identifier, a public land mobile network identifier, the first user identifier, and the second user identifier, and the H( ) algorithm is a Hash( ) algorithm or an HMAC( ) algorithm; and K_session=KDF (K_com, (at least one of session identifier, first random parameter, second random parameter, service identifier, first user identifier, and second user identifier)).

When the authentication feature is a ciphertext, the generating a first authentication feature includes:

obtaining, by the first user equipment, the first user identifier and the second user identifier, and encrypting the first user identifier, the second user identifier, and the second random parameter by using the first user identifier, the communication shared key (K_com), or the session key (K_session), to generate a first ciphertext.

In a case, the authentication feature is a digital signature. In this case, before the first authentication feature is generated, the method further includes:

receiving, by the first user equipment, the first random parameter and a second random parameter from the second user equipment; and the generating a first authentication feature includes: calculating a first digital signature based on the first random parameter, the second random parameter, and a first subscriber key, where the first digital signature=Sign (SK_ID1, (at least one of first random parameter and second random parameter), (at least one of session identifier, first user identifier, second user identifier, service identifier, slice identifier, link identifier, connection identifier, serving network identifier, and public land mobile network identifier)), where the session identifier, the service identifier, the slice identifier, the link identifier, the connection identifier, the serving network identifier, and the public land mobile network identifier are obtained by the second user equipment in advance or received from the first user equipment.

According to a third aspect, an authentication method is provided. The method includes:

receiving, by second user equipment, a first random parameter from first user equipment;

obtaining, by the second user equipment, a first user identifier, a second user identifier, and a second random parameter, generating a second authentication feature based on the first user identifier, the second user identifier, the first random parameter, and the second random parameter, and sending the second authentication feature to the first user equipment;

receiving, by the second user equipment, a first authentication feature from the first user equipment; and attempting to authenticate, by the second user equipment, correctness of the first authentication feature.

In a case, the authentication feature is a message authentication code (MAC). In this case, after a second MAC is generated, the method further includes:

sending, by the second user equipment, the first random parameter and the second random parameter to the first user equipment.

When the authentication feature is a message authentication code, the generating a second MAC includes:

generating a communication shared key (K_com) and/or a session key (K_session) based on the first user identifier and the second user identifier; and generating the second MAC based on the communication shared key (K_com) or the session key (K_session), the first random parameter, and the second random parameter, where K_com=H (e(xH(ID1), H(ID2))^{H (parameter 1)}), where the parameter 1 may be at least one of a service identifier, a slice identifier, a link identifier, a connection identifier, a session identifier, a serving network identifier, a public land mobile network identifier, the first user identifier, and the second user identifier, and the H( ) algorithm is a Hash( ) algorithm or an HMAC( ) algorithm;

K_session=KDF (K_com, (at least one of session identifier, first random parameter, second random parameter, service identifier, first user identifier, and second user identifier)); and the second MAC=MAC (K_com or K_session, (at least one of first random parameter and second random parameter), (at least one of session identifier, first user identifier, second user identifier, service identifier, slice identifier, link identifier, connection identifier, serving network identifier, and public land mobile network identifier)), where the session identifier, the service identifier, the slice identifier, the link identifier, the connection identifier, the serving network identifier, and the public land mobile network identifier are obtained by the second user equipment in advance or received from the first user equipment.

In a case, the authentication feature is a ciphertext. In this case, the generating a second authentication feature based on the first user identifier, the second user identifier, the first random parameter, and the second random parameter includes:

encrypting the first user identifier, the second user identifier, the first random parameter, and the second random parameter by using the first user identifier, a communication shared key (K_com), or a session key (K_session), to generate a second ciphertext; and when the authentication feature is a ciphertext, the attempting to authenticate, by the second user equipment, correctness of the first authentication feature may include:

decrypting, by the second user equipment, a first ciphertext by using a first subscriber key, the communication shared key (K_com), or the session key (K_session), to obtain a second random parameter, and determining whether the second random parameter obtained by decryption is the same as the previously encrypted second random parameter, where if the second random parameter obtained by decryption is the same as the previously encrypted second random parameter, authentication succeeds, where K_com=e(xH(ID1), H(ID2)), K_com=H (e(xH(ID1), H(ID2)), or K_com=H (e(xH(ID1), H(ID2))^{H (parameter 1)}), where the parameter 1 may be at least one of a service identifier, a slice identifier, a link identifier, a connection identifier, a session identifier, a serving network identifier, a public land mobile network identifier, the first user identifier, and the second user identifier, and the H( ) algorithm is a Hash( ) algorithm or an HMAC( ) algorithm; and K_session=KDF (K_com, (at least one of session identifier, first random parameter, second random parameter, service identifier, first user identifier, and second user identifier)).

In a case, the authentication feature is a digital signature. In this case, the generating a second authentication feature includes:

a second digital signature=Sign (SK_ID2, (at least one of first random parameter and second random parameter), (at least one of session identifier, first user identifier, second user identifier, service identifier, slice identifier, link identifier, connection identifier, serving network identifier, and public land mobile network identifier)); and when the authentication feature is a digital signature, after the second digital signature is generated, the method further includes: sending, by the second user equipment, the first random parameter and the second random parameter to the first user equipment.

According to a fourth aspect, an authentication apparatus is provided. The authentication apparatus includes:

a sending module, configured to send a first random parameter to second user equipment;

a receiving module, configured to receive a second authentication feature from the second user equipment; and a processing module, configured to: attempt to authenticate correctness of the second authentication feature, and generate a first authentication feature, where the sending module is further configured to send the first authentication feature to the second user equipment.

In a case, the authentication feature is a message authentication code. In this case, before the first authentication feature is generated, the receiving module is further configured to: receive the first random parameter and a second random parameter from the second user equipment; and the processing module is specifically configured to: obtain the first user identifier and the second user identifier, generate a communication shared key (K_com) and/or a session key (K_session) based on the first user identifier and the second user identifier, and generate a first MAC based on the communication shared key (K_com) or the session key (K_session), the first random parameter, and the second random parameter, where K_com=H (e(xH(ID1), H(ID2))^{H (parameter 1)}), where the parameter 1 may be at least one of a service identifier, a slice identifier, a link identifier, a connection identifier, a session identifier, a serving network identifier, a public land mobile network identifier, the first user identifier, and the second user identifier, and the H( ) algorithm is a Hash( ) algorithm or an HMAC( ) algorithm;

K_session=KDF (K_com, (at least one of session identifier, first random parameter, second random parameter, service identifier, first user identifier, and second user identifier)); and the first MAC=MAC (K_com or K_session, (at least one of first random parameter and second random parameter), (at least one of session identifier, first user identifier, second user identifier, service identifier, slice identifier, link identifier, connection identifier, serving network identifier, and public land mobile network identifier)), where the session identifier, the service identifier, the slice identifier, the link identifier, the connection identifier, the serving network identifier, and the public land mobile network identifier are obtained by the first user equipment in advance or received from the first user equipment.

In a case, the authentication feature is a ciphertext. In this case, the processing module is specifically configured to:

decrypt a second ciphertext by using a first subscriber key, a communication shared key (K_com), or a session key (K_session), to obtain a first random parameter and a second random parameter, and determining whether the first random parameter obtained by decryption is the same as the first random parameter previously sent to the second user equipment, where if the first random parameter obtained by decryption is the same as the first random parameter previously sent to the second user equipment, authentication succeeds, where K_com=e(xH(ID1), H(ID2)), K_com=H (e(xH(ID1), H(ID2)), or K_com=H (e(xH(ID1), H(ID2))^{H (parameter 1)}), where the parameter 1 may be at least one of a service identifier, a slice identifier, a link identifier, a connection identifier, a session identifier, a serving network identifier, a public land mobile network identifier, the first user identifier, and the second user identifier, and the H( ) algorithm is a Hash( ) algorithm or an HMAC( ) algorithm; and K_session=KDF (K_com, (at least one of session identifier, first random parameter, second random parameter, service identifier, first user identifier, and second user identifier)).

When the authentication feature is a ciphertext, the processing module is specifically configured to:

obtain the first user identifier and the second user identifier, and encrypt the first user identifier, the second user identifier, and the second random parameter by using the first user identifier, the communication shared key (K_com), or the session key (K_session), to generate a first ciphertext.

In a case, the authentication feature is a digital signature. In this case, the receiving module is further configured to:

receive, by the first user equipment, the first random parameter and the second random parameter from the second user equipment; and the processing module is specifically configured to calculate a first digital signature based on the first random parameter, the second random parameter, and a first subscriber key, where the first digital signature=Sign (SK_ID1, (at least one of first random parameter and second random parameter), (at least one of session identifier, first user identifier, second user identifier, service identifier, slice identifier, link identifier, connection identifier, serving network identifier, and public land mobile network identifier)), where the session identifier, the service identifier, the slice identifier, the link identifier, the connection identifier, the serving network identifier, and the public land mobile network identifier are obtained by the second user equipment in advance or received from the first user equipment.

According to a fifth aspect, an authentication apparatus is provided. The authentication apparatus includes:

a receiving module, configured to receive a first random parameter from first user equipment; and a processing module, configured to: obtain a first user identifier, a second user identifier, and a second random parameter, generate a second authentication feature based on the first user identifier, the second user identifier, the first random parameter, and the second random parameter, and send the second authentication feature to the first user equipment, where the receiving module is further configured to receive a first authentication feature from the first user equipment; and the processing module is further configured to attempt to authenticate correctness of the first authentication feature.

In a case, the authentication feature is a message authentication code, and the authentication apparatus further includes a sending module, configured to:

after the processing module generates a second MAC, send the first random parameter and the second random parameter to the first user equipment.

When the authentication feature is a message authentication code, the processing module is specifically configured to:

generate a communication shared key (K_com) and/or a session key (K_session) based on the first user identifier and the second user identifier; and generate the second MAC based on the communication shared key (K_com) or the session key (K_session), the first random parameter, and the second random parameter, where K_com=H (e(xH(ID1), H(ID2))^{H (parameter 1)}), where the parameter 1 may be at least one of a service identifier, a slice identifier, a link identifier, a connection identifier, a session identifier, a serving network identifier, a public land mobile network identifier, the first user identifier, and the second user identifier, and the H( ) algorithm is a Hash( ) algorithm or an HMAC( ) algorithm;

K_session=KDF (K_com, (at least one of session identifier, first random parameter, second random parameter, service identifier, first user identifier, and second user identifier)); and the second MAC=MAC (K_com or K_session, (at least one of first random parameter and second random parameter), (at least one of session identifier, first user identifier, second user identifier, service identifier, slice identifier, link identifier, connection identifier, serving network identifier, and public land mobile network identifier)), where the session identifier, the service identifier, the slice identifier, the link identifier, the connection identifier, the serving network identifier, and the public land mobile network identifier are obtained by the second user equipment in advance or received from the first user equipment.

In a case, the authentication feature is a ciphertext, and the processing module is specifically configured to:

encrypt the first user identifier, the second user identifier, the first random parameter, and the second random parameter by using the first user identifier, a communication shared key (K_com), or a session key (K_session), to generate a second ciphertext; and the attempting to authenticate correctness of the first authentication feature includes:

decrypt a first ciphertext by using a first subscriber key, a communication shared key (K_com), or a session key (K_session), to obtain a second random parameter, and determining whether the second random parameter obtained by decryption is the same as the previously encrypted second random parameter, where if the second random parameter obtained by decryption is the same as the previously encrypted second random parameter, authentication succeeds, where K_com=e(xH(ID1), H(ID2)), K_com=H (e(xH(ID1), H(ID2)), or K_com=H (e(xH(ID1), H(ID2))^{H (parameter 1)}), where the parameter 1 may be at least one of a service identifier, a slice identifier, a link identifier, a connection identifier, a session identifier, a serving network identifier, a public land mobile network identifier, the first user identifier, and the second user identifier, and the H( ) algorithm is a Hash( ) algorithm or an HMAC( ) algorithm; and K_session=KDF (K_com, (at least one of session identifier, first random parameter, second random parameter, service identifier, first user identifier, and second user identifier)).

In a case, the authentication feature is a digital signature;

the processing module is specifically configured to: generate a second digital signature in the following manner:

the second digital signature=Sign (SK_ID2, (at least one of first random parameter and second random parameter), (at least one of session identifier, first user identifier, second user identifier, service identifier, slice identifier, link identifier, connection identifier, serving network identifier, and public land mobile network identifier)); and after the processing module generates the second digital signature, the authentication apparatus further includes a sending module, configured to: send the first random parameter and the second random parameter to the first user equipment.

According to a sixth aspect, an authentication system is provided, including the first authentication apparatus according to the fourth aspect and the second authentication apparatus according to the fifth aspect.

In the authentication method, the authentication apparatus, and the authentication system provided in the embodiments of the present invention, authentication is performed between two terminal devices by using a MAC, a ciphertext, or a digital signature, and in an authentication process, participation of an HSS is not required, so that an authentication flexibility requirement of a service can be satisfied.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may derive other drawings from these accompanying drawings without creative efforts.

DESCRIPTION OF EMBODIMENTS

To make the objectives, technical solutions, and advantages of the present invention clearer, the following further describes the implementation manners of the present invention in detail with reference to the accompanying drawings.

Figure 1:
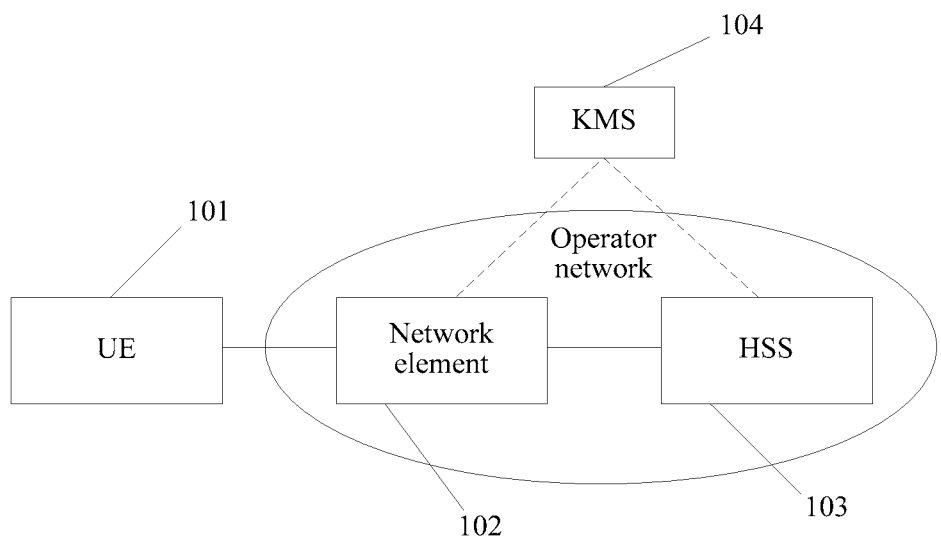
FIG. 1 is an architectural diagram of a communications system according to an embodiment of the present invention.

FIG. 1 is an architectural diagram of a communications system according to an embodiment of the present invention. Referring to FIG. 1, the key distribution system provided in this embodiment of the present invention may include UE 101, a communications network element 102, and an HSS 103. The communications network element 102 and the HSS 103 are devices belonging to an operator network. The communications network element 102 may be, for example, an authentication center or a control node. As shown in FIG. 1, the key distribution system provided in this embodiment of the present invention may further include a key management center (KMS) 104. The KMS 104 performs functions of generating, distributing, and managing a subscriber private key. In this embodiment of the present invention, the KMS 104 may be integrated into various network devices as a functional module, for example, is integrated into the communications network element 102 and the HSS 103, or may be used as an independent network device. When the KMS 104 is used as an independent network device, the KMS 104 may be deployed outside an operator, or may be disposed outside the operator network. There may be an interface between the KMS 104 and a network device (for example, the communications network element 102 and the HSS 103) of the operator network. Further, there may be an interface directly between the KMS and the UE 101, and in this case, the KMS can directly distribute a key to the UE 101 without using the operator network. In the key distribution system provided in this embodiment of the present invention, the UE 101 first communicates with the communications network element 102 and the HSS 103, to complete AKA network access authentication. After AKA network access authentication succeeds, a key is distributed.

A key distribution method provided in an embodiment of the present invention may include a key distribution method based on a KMS of an operator and a key distribution method based on a KMS of a third party. In the key distribution method based on the operator KMS, the KMS is a network element of the operator, and in the key distribution method based on the third party KMS, the KMS may alternatively be controlled by the third party.

In this embodiment of the present invention, the key distribution method based on the operator KMS may include the following several cases: (1) the KMS is deployed in a communications network element, and the communications network element distributes a private key; (2) the KMS is deployed in an HSS, and the HSS distributes a private key; (3) the KMS is deployed independent from a communications network element, but there is an interface between the KMS and the communications network element, the KMS generates a subscriber private key, and the communications network element distributes the subscriber private key to UE; and (4) the KMS is deployed independent from an HSS, but there is an interface between the KMS and the HSS, the KMS generates a subscriber private key, and the communications network element distributes the subscriber private key to UE.

In this embodiment of the present invention, the key distribution method based on the third party KMS may include the following several cases: (1) a KMS is deployed as an independent network element, the KMS sends a message authentication code (MAC) from UE to an operator network element for authentication, and after authentication of the operator network element succeeds, a subscriber private key is distributed; and (2) a KMS is deployed as an independent network element, the KMS sends a token from UE to an operator network element for authentication, and after authentication of the operator network element succeeds, a subscriber private key is distributed.

Figure 2:
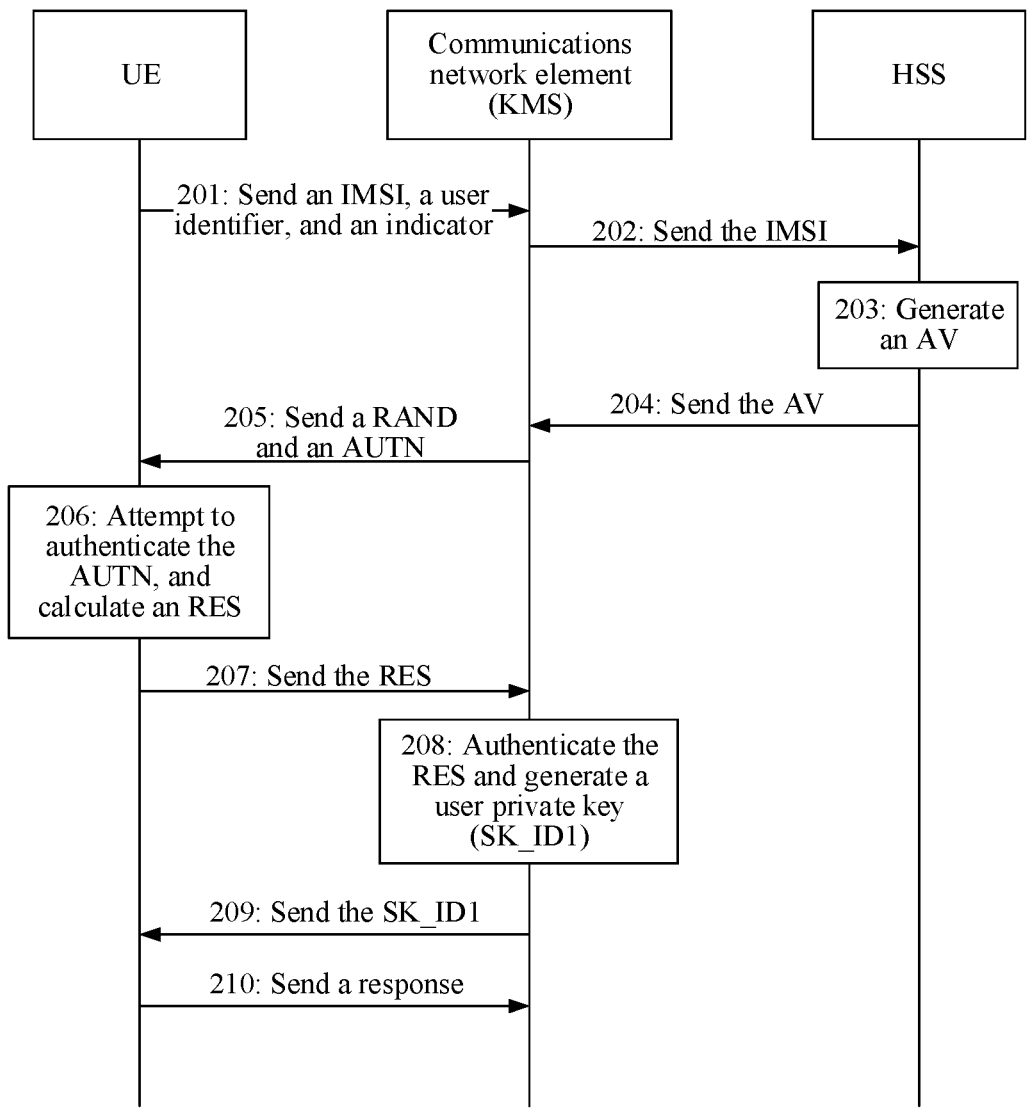
FIG. 2 is a flowchart of a key distribution method based on a KMS of an operator according to an embodiment of the present invention.

The following first describes the key distribution method based on a KMS of an operator provided in this embodiment of the present invention. FIG. 2 is a flowchart of a key distribution method based on a KMS of an operator according to an embodiment of the present invention. In the key distribution method based on the operator KMS shown in FIG. 2, a KMS is deployed in a communications network element, and the communications network element generates a subscriber private key (SK_ID1), and distributes the subscriber private key to UE after authentication of the UE succeeds.

Referring to FIG. 2, the key distribution method based on the operator KMS provided in this embodiment of the present invention may include:

201: UE initiates a request to a communications network element, where the request may carry an IMSI, a user identifier (ID1), and an indicator. Optionally, the request may carry only an IMSI and an indicator.

In this embodiment of the present invention, the communications network element may be an authentication center or a control node, both of which includes a KMS functional module. The request may be specifically a user identity request, or certainly may be various self-defined requests. A specific request name is not limited in this embodiment of the present invention, provided that the request carries the IMSI, the user identifier ID1, and the indicator.

A user of the user identifier may be an industry user or a company, or may be a terminal user or a terminal. The user identifier may be any one of the following: an industry user identifier, a service identifier, a company identifier, and an identifier of an individual user. The identifier of the individual user may be, for example, an international mobile equipment identity (IMEI), an international mobile subscriber identity (IMSI), an IP multimedia private identity (IP Multimedia Private Identity, IMPI), a temporary mobile subscriber identity (TMSI), an Internet Protocol (IP) multimedia public identity (IMPI), a Media Access Control address (MAC address), an IP address, a phone number and a globally unique temporary identifier (GUTI), a service identifier (service ID), a user application identifier (user App ID), and a device ID. When the user identifier is the identifier of the individual user and the identifier of the individual user is an IMSI, the request may carry only the IMSI and the indicator. When the identifier of the individual user is not an IMSI, the request may carry the IMSI, the user identifier (ID1), and the indicator, or the request may carry the IMSI and the indicator.

The indicator is used to indicate to a network that the request is used to initiate AKA authentication and obtain an identity-based private key.

202: The communications network element receives the request sent by the UE, and sends, to an HSS, the IMSI from the UE by using a message. After obtaining the request from the UE, the communications network element may learn, based on the indicator, that key distribution subsequently needs to be performed.

In this step, the message sent by the communications network element to the HSS may further include the indicator in step 201.

203: The HSS receives the IMSI, and performs the following operation of calculating an authentication vector (AV), where AV=(RAND, AUTN, XRES, Kasme), the RAND is an authentication random number, the XRES is a response value, the AUTN is an authentication value, and the Kasme is an authenticated shared key.

If the message in step 202 includes the indicator, the HSS may learn, based on the indicator, that a key needs to be distributed. Meanwhile, optionally, in a process of generating the AV, the HSS may set an $X^{th}$ bit of an authentication management field (AMF) parameter in the AUTN to 1, where $1 \leq X \leq 7$. In this way, the communications network element may subsequently determine, by using the parameter, whether an authentication procedure of the UE includes identity-based key distribution. Certainly, in this step, the HSS may alternatively not perform the operation of setting a bit of the AMF parameter, that is, does not set a bit of the AMF parameter. In this way, the communications network element may still determine whether the received message includes the indicator in step 202, to determine whether the authentication procedure of the UE includes identity-based key distribution.

If the message received by the HSS from the communications network element includes no indicator, the HSS may not set a bit of the AMF parameter, and performs authentication in a conventional AKA manner.

204: After generating the AV, the HSS sends the AV to the communications network element. Optionally, the HSS may further send the indicator to the communications network element.

As can be learned from steps 201 to 204, the communications network element may send the indicator to the HSS or may not send the indicator to the HSS. After receiving the indicator from the communications network element, the HSS may set a bit of the AMF parameter, and may choose to send the indicator to the communications network element or not to send the indicator to the communications network element.

205: After receiving the AV from the HSS, the communications network element sends the RAND and the AUTN to UE.

206: The UE attempts to authenticate the AUTN, and after the AUTN is authenticated, calculates an RES as a response to the communications network element.

207: The UE sends the RES to the communications network element by using a message.

208: After receiving the RES, the communications network element authenticates whether the RES and an XRES in the AV are the same. If the RES and the XRES in the AV are the same, authentication succeeds; or if the RES and the XRES in the AV are different, an authentication failure is returned. When authentication succeeds, the communications network element generates a subscriber private key (SK_ID1) by using an identity-based algorithm.

The communications network element may calculate SK_ID1 by using the following several identifiers: (1) a user identifier (ID1); (2) an operator identifier||a user identifier (ID||ID1), where || is a cascading form and indicates that the operator identifier and the user identifier are connected as one identifier, and the operator identifier may be a public land mobile network identifier (PLMN ID), a serving network identifier (serving network ID), a local operator network identifier, or the like; and (3) an operator identifier||a user identifier||a time (ID||ID1||time) or a user identifier||a time (ID1||time).

It should be noted herein that when the request sent by the UE to the communications network element carries only the IMSI and the indicator and the IMSI is not used as an identifier of an individual user, after the communications network element succeeds in authentication, the UE may send the user identifier to the communications network element. In this way, after receiving the user identifier, the communications network element may generate the subscriber private key (SK_ID1) based on the user identifier.

209: The communications network element sends SK_ID1 to the UE. In an optional manner, in this step, the communications network element may further send SK_ID1 and GPK to the UE, where GPK is a global public key.

210: The UE sends a response to the communications network element. This step is an optional step. In this embodiment of the present invention, the UE may alternatively not send the response to the communications network element.

In the key distribution method based on a KMS (deployed inside the communications network element) of an operator provided in this embodiment of the present invention, the UE sends the indicator to the communications network element, the communications network element can learn, based on the indicator, that an authentication procedure of the UE needs to include identity-based key distribution, and when authentication of the UE succeeds, the communications network element may distribute the private key to the UE. In addition, in the key distribution method based on a KMS of an operator, because the KMS is deployed in the communications network element of the operator, after authentication of the UE succeeds, the private key may be distributed to the UE without further authentication by the operator, thereby reducing communication overheads.

Figure 3:
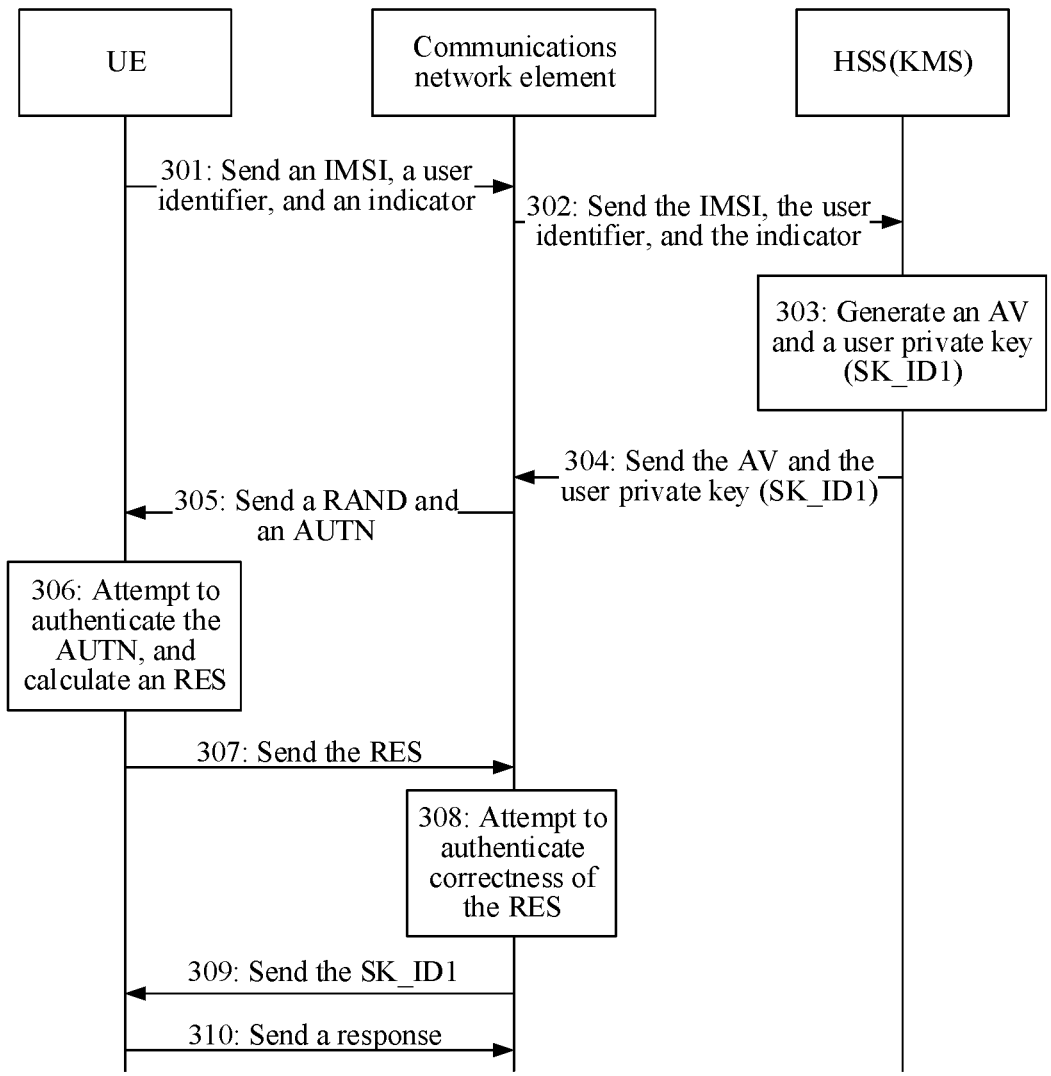
FIG. 3 is a flowchart of a key distribution method based on a KMS of an operator according to an embodiment of the present invention.

FIG. 3 is a flowchart of a key distribution method based on a KMS of an operator according to an embodiment of the present invention. In the key distribution method based on the operator KMS shown in FIG. 3, a KMS is deployed in an HSS, and the HSS generates a subscriber private key (SK_ID1), and distributes the subscriber private key to UE after authentication of the UE succeeds.

Referring to FIG. 3, the key distribution method based on the operator KMS provided in this embodiment of the present invention may include:

301: UE initiates a request to a communications network element, where the request may carry an IMSI, a user identifier (ID1), and an indicator. Optionally, the request may carry only an IMSI and an indicator. In this embodiment of the present invention, the request may be specifically a user identity request, or certainly may be various self-defined requests. A specific request name is not limited in this embodiment of the present invention, provided that the request carries the IMSI, the user identifier ID1, and the indicator.

For descriptions of the user identifier and the indicator, refer to corresponding content in step 201.

302: The communications network element receives the request sent by the UE, and sends, to an HSS, the IMSI, the indicator, and the user identifier from the UE by using a message. After obtaining the request from the UE, the communications network element may learn, based on the indicator, that key distribution subsequently needs to be performed.

In this step, the message sent by the communications network element to the HSS may include only the IMSI and the user identifier. In this case, the HSS may determine, based on UE information stored by the HSS, whether identity-based key distribution needs to be performed.

303: The HSS receives the IMSI and the indicator, and performs the following operation of calculating an authentication vector (AV), where AV=(RAND, AUTN, XRES, Kasme), and a KMS generates a subscriber private key (SK_ID1) by using an identity-based algorithm.

The RAND is an authentication random number, the XRES is a response value, the AUTN is an authentication value, and the Kasme is an authenticated shared key.

The KMS may calculate SK_ID1 by using the following several identifiers: (1) a user identifier (ID1); (2) an operator identifier||a user identifier, (ID||ID1), where the operator identifier may be a public land mobile network identifier (PLMN ID), a serving network identifier (serving network ID), a local operator network identifier, or the like; and (3) an operator identifier||a user identifier||a time (ID||ID1||time) or a user identifier||a time (ID1||time).

Optionally, after receiving the indicator, in a process of generating the AV, the HSS may set an $X^{th}$ bit of an AMF parameter in the AUTN to 1, where 1≤X≤7. In this way, the communications network element may subsequently determine, by using the parameter, whether an authentication procedure of the UE includes identity-based key distribution. Certainly, in this step, the HSS may alternatively not perform the operation of setting a bit of the AMF parameter, that is, does not set a bit of the AMF parameter, but instead may send the indicator to the communications network element. In this way, the communications network element may still determine subsequently whether the received message includes the indicator, to determine whether the authentication procedure of the UE includes identity-based key distribution.

If the message received by the HSS includes no indicator, it indicates that the authentication procedure of the UE includes no identity-based key distribution. In this case, the HS S performs authentication in a conventional AKA manner.

As can be learned from steps 301 to 303, the communications network element may send the indicator to the HSS, the HSS may send the indicator to the communications network element when not performing a bit setting operation, and after performing a bit setting operation, the HSS may or may not send the indicator to the communications network element.

304: After the AV and the subscriber private key (SK_ID1) are generated, the HSS sends the AV and the subscriber private key (SK_ID1) to the communications network element by using a message, and optionally, may further send GPK to the communications network element.

305: After receiving the AV and the subscriber private key (SK_ID1) from the HSS, the communications network element sends the RAND and the AUTN to the UE.

306: The UE attempts to authenticate the AUTN after receiving the RAND and the AUTN, and after the AUTN is authenticated, calculates an RES as a response to the communications network element.

307: The UE sends the RES to the communications network element by using a message.

308: After receiving the RES, the communications network element authenticates whether the RES and an XRES in the AV are the same. If the RES and the XRES in the AV are the same, authentication succeeds; or if the RES and the XRES in the AV are different, an authentication failure is returned.

309: The communications network element sends SK_ID1 to the UE by using a message after authentication succeeds. In an optional manner, in this step, the communications network element may further send SK_ID1 and GPK to the UE, where GPK is a global public key.

It should be noted herein that when the request sent by the UE to the communications network element carries only the IMSI and the indicator and the IMSI is not used as an identifier of an individual user, after the communications network element succeeds in authentication, the UE may send the user identifier to the communications network element. In this way, after receiving the user identifier, the communications network element may generate the subscriber private key (SK_ID1) based on the user identifier, and send SK_ID1 to the UE.

310: The UE sends a response to the communications network element. This step is an optional step. In this embodiment of the present invention, the UE may alternatively not send the response to the communications network element.

In the key distribution method based on a KMS of an operator provided in this embodiment of the present invention, the UE sends the indicator to the communications network element, the communications network element can learn, based on the indicator, that an authentication procedure of the UE needs to include identity-based key distribution, and when authentication of the UE succeeds, the communications network element may distribute the private key to the UE. In addition, in the key distribution method based on a KMS of an operator, because the KMS is deployed in the HSS of the operator, after authentication of the UE succeeds, the private key may be distributed to the UE without further authentication by the operator, thereby reducing communication overheads.

Figure 4:
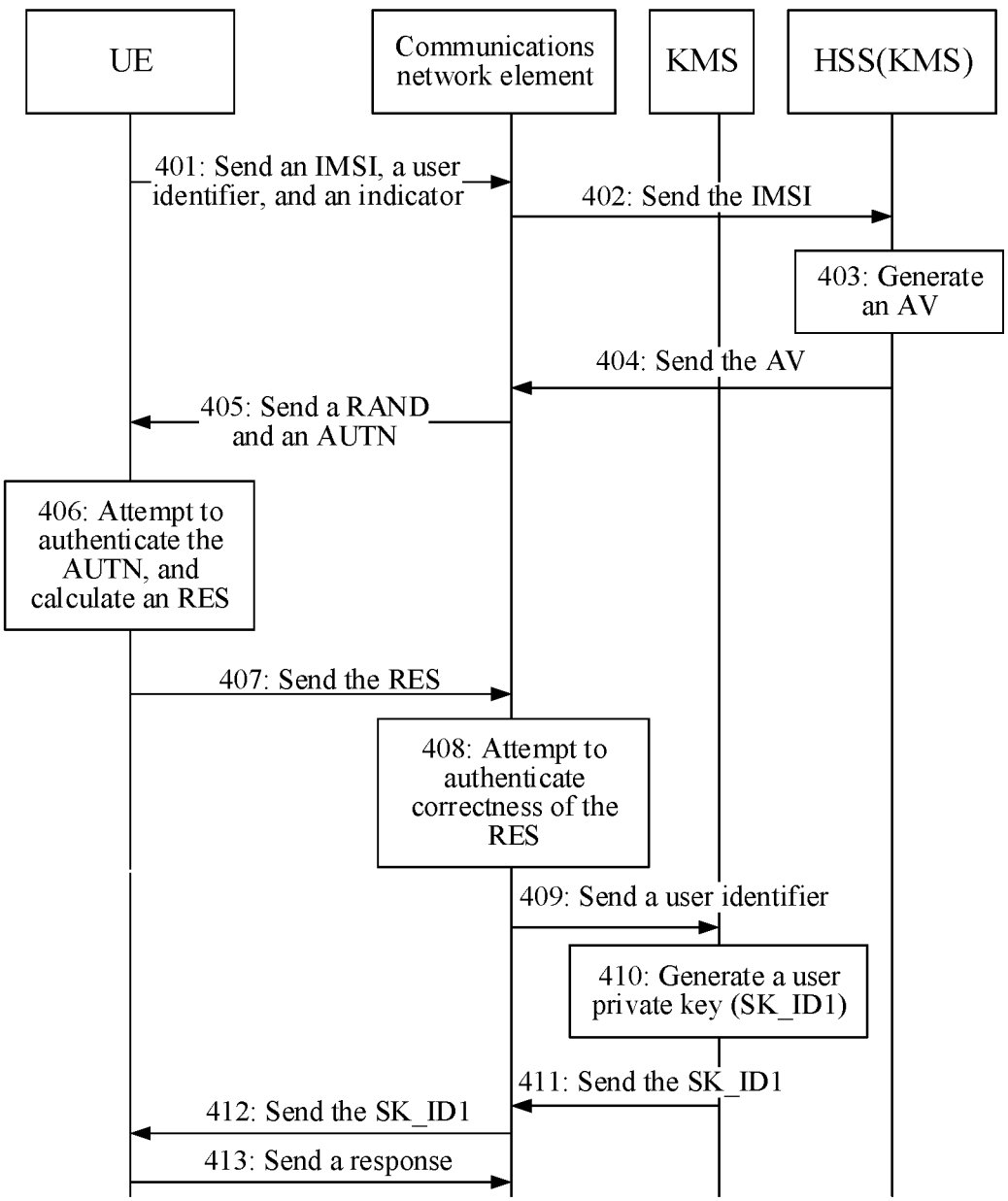
FIG. 4 is a flowchart of a key distribution method based on a KMS of an operator according to an embodiment of the present invention.

FIG. 4 is a flowchart of a key distribution method based on a KMS of an operator according to an embodiment of the present invention. In the key distribution method based on a KMS of an operator shown in FIG. 4, a KMS is deployed independent from a communications network element, but there is an interface between the KMS and the communications network element. The KMS generates a subscriber private key (SK_ID1), and after authentication of UE succeeds, the communications network element distributes the subscriber private key to the UE. In the embodiment shown in FIG. 4, after AKA authentication succeeds, the communications network element initiates, to the KMS, a request for obtaining the subscriber private key.

Referring to FIG. 4, the key distribution method based on the operator KMS provided in this embodiment of the present invention may include:

401: UE 1 initiates a request to a communications network element, where the request may carry an IMSI, a user identifier (ID1), and an indicator. Optionally, the request may carry only an IMSI and an indicator. In this embodiment of the present invention, the request may be specifically a user identity request, or certainly may be various self-defined requests. A specific request name is not limited in this embodiment of the present invention, provided that the request carries the IMSI, the user identifier (ID1), and the indicator.

For descriptions of the user identifier and the indicator, refer to content below step 201.

402: The communications network element receives the request sent by the UE, and sends, to an HSS, the IMSI from the UE by using a message. Optionally, the communications network element may further send the indicator to the HSS. After obtaining the request from the UE, the communications network element may learn, based on the indicator, that key distribution subsequently needs to be performed.

403: The HSS receives the IMSI, and performs the following operation of calculating an authentication vector (AV), where AV=(RAND, AUTN, XRES, Kasme), the RAND is an authentication random number, the XRES is a response value, an AUTN is an authentication value, and the Kasme is an authenticated shared key.

If the communications network element sends the indicator to the HSS in step 402, the HSS may learn, based on the indicator, that a key needs to be distributed. Meanwhile, optionally, in a process of generating the AV, the HSS may set an $X^{th}$ bit of an AMF parameter in the AUTN to 1, where 1≤X≤7. In this way, the communications network element may subsequently determine, by using the parameter, whether an authentication procedure of the UE includes identity-based key distribution. Certainly, in this step, the HSS may alternatively not perform the operation of setting a bit of the AMF parameter, that is, does not set a bit of the AMF parameter. In this way, the communications network element may still determine subsequently whether the received message includes the indicator in step 404, to determine whether the authentication procedure of the UE includes identity-based key distribution.

If the message received by the HSS from the communications network element includes no indicator, the HSS does not set a bit of the AMF parameter.

404: After generating the AV, the HSS sends the AV to the communications network element by using a message. Optionally, the HSS may further send the indicator to the communications network element.

As can be learned from steps 401 to 404, the communications network element may send the indicator to the HSS or may not send the indicator to the HSS. After receiving the indicator from the communications network element, the HSS may set a bit of the AMF parameter, and may choose to send the indicator to the communications network element or not to send the indicator to the communications network element.

405: After receiving the AV from the HSS, the communications network element sends the RAND and the AUTN to UE.

406: The UE attempts to authenticate the AUTN, and after the AUTN is authenticated, calculates an RES as a response to the communications network element.

407: The UE sends the RES to the communications network element by using a message.

408: After receiving the RES, the communications network element authenticates whether the RES and an XRES in the AV are the same. If the RES and the XRES in the AV are the same, authentication succeeds; or if the RES and the XRES in the AV are different, an authentication failure is returned.

409: When authentication succeeds, the communications network element sends a user identifier (ID1) to the KMS. The user identifier may be the user identifier in step 401, or may be a user identifier immediately sent by the UE after the UE learns that the communications network element succeeds in authentication.

410: The KMS generates a subscriber private key (SK_ID1) by using an identity-based algorithm.

The KMS may calculate SK_ID1 by using the following several identifiers: (1) a user identifier (ID1); (2) an operator identifier||a user identifier, (ID||ID1), where the operator identifier may be a public land mobile network identifier (PLMN ID), a serving network identifier (serving network ID), a local operator network identifier, or the like; and (3) an operator identifier||a user identifier||a time (ID||ID1||time) or a user identifier||a time (ID1||time).

411: The KMS sends the subscriber private key (SK_ID1) to the communications network element. In an optional manner, in this step, the KMS may further send SK_ID1 and GPK to the communications network element, where GPK is a global public key.

412: After receiving the subscriber private key (SK_ID1), the communications network element sends the subscriber private key (SK_ID1) to the UE. Certainly, when receiving the subscriber private key (SK_ID1) and GPK, the communications network element sends the subscriber private key (SK_ID1) and GPK to the UE.

413: The UE sends a response to the communications network element after receiving the subscriber private key (SK_ID1) or the subscriber private key (SK_ID1) and GPK. This step is an optional step. In this embodiment of the present invention, the UE may alternatively not send the response to the communications network element.

It should be noted herein that, in this embodiment of the present invention, optionally, in step 401, the request sent by the user to the communications network element may carry only the IMSI and the indicator. Correspondingly, after step 407, that is, after AKA authentication succeeds, the UE may send the user identifier to the communications network element, to request an identity-based subscriber private key.

In the key distribution method based on a KMS of an operator provided in this embodiment of the present invention, the UE sends the indicator to the communications network element, the communications network element can learn, based on the indicator, that an authentication procedure of the UE needs to include identity-based key distribution, and when authentication of the UE succeeds, the communications network element may request the subscriber private key from the KMS, and distribute the subscriber private key to the UE after obtaining the subscriber private key generated by the KMS. In addition, in the key distribution method based on a KMS of an operator, because the KMS is deployed in the operator network, after authentication of the UE succeeds, the communications network element may directly distribute the subscriber private key to the UE without further authentication by the operator, thereby reducing communication overheads.

Figure 5:
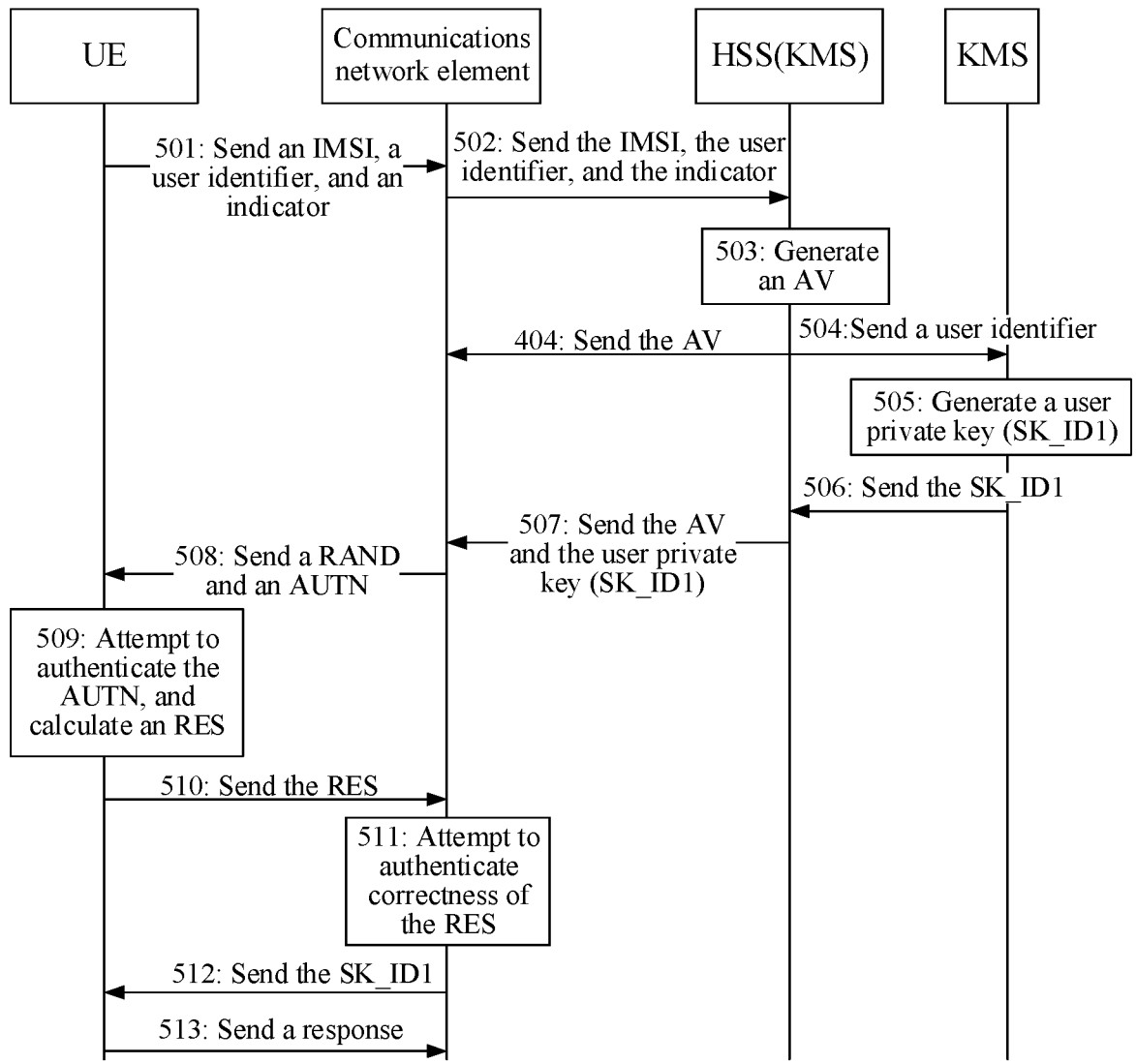
FIG. 5 is a flowchart of a key distribution method based on a KMS of an operator according to an embodiment of the present invention.

FIG. 5 is a flowchart of a key distribution method based on a KMS of an operator according to an embodiment of the present invention. In the key distribution method based on a KMS of an operator shown in FIG. 5, a KMS is deployed independent from an HSS, but there is an interface between the KMS and the HSS. The KMS generates a subscriber private key, and a communications network element distributes the subscriber private key to UE.

Referring to FIG. 5, the key distribution method based on the operator KMS provided in this embodiment of the present invention may include:

501: UE initiates a request to a communications network element, where the request may carry an IMSI, a user identifier (ID1), and an indicator. In this embodiment of the present invention, the request may be specifically a user identity request, or certainly may be various self-defined requests. A specific request name is not limited in this embodiment of the present invention, provided that the request carries the IMSI, the user identifier ID1, and the indicator.

For descriptions of the user identifier and the indicator, refer to corresponding content in step 201.

502: The communications network element receives the request sent by the UE, and sends the IMSI, the user identifier, and the indicator from the UE to an HSS by using a message.

503: The HSS receives the IMSI, the user identifier, and the indicator, and performs the following operation of calculating an authentication vector (AV), where AV=(RAND, AUTN, XRES, Kasme), the RAND is an authentication random number, the XRES is a response value, an AUTH is an authentication value, and the Kasme is an authenticated shared key.

Optionally, after receiving the indicator, in a process of generating the AV, the HSS may set an $X^{th}$ bit of an AMF parameter in the AUTN to 1, where $1 \leq X \leq 7$. In this way, the communications network element may subsequently determine, by using the parameter, whether an authentication procedure of the UE includes identity-based key distribution. Certainly, in this step, the HSS may alternatively not perform the operation of setting a bit of the AMF parameter, that is, does not set a bit of the AMF parameter, but instead may send the indicator to the communications network element. In this way, the communications network element may still determine subsequently whether the received message includes the indicator, to determine whether the authentication procedure of the UE includes identity-based key distribution.

If the message received by the HSS includes no indicator, it indicates that the authentication procedure of the UE includes no identity-based key distribution. In this case, the HSS performs authentication in a conventional AKA manner.

504: The HSS sends a user identifier (ID1) to the KMS by using a message.

505: After receiving the user identifier (ID1) from the HSS, the KMS generates a subscriber private key (SK_ID1) by using an identity-based algorithm. The KMS may calculate SK_ID1 by using the following several identifiers: (1) a user identifier (ID1); (2) an operator identifier||a user identifier, (ID|ID1), where the operator identifier may be a public land mobile network identifier (PLMN ID), a serving network identifier (serving network ID), a local operator network identifier, or the like; and (3) an operator identifier||a user identifier||a time (ID||ID1||time) or a user identifier||a time (ID1||time).

506: The KMS sends the subscriber private key (SK_ID1) to the HSS. Optionally, the KMS may send the subscriber private key (SK_ID1) and GPK.

507: After the AV and the subscriber private key (SK_ID1) are obtained, the HSS sends the AV and the subscriber private key (SK_ID1) to the communications network element by using a message, and optionally, may further send GPK to the communications network element.

508: After receiving the AV and the subscriber private key (SK_ID1) from the HSS, the communications network element sends the RAND and the AUTN to the UE.

509: The UE attempts to authenticate the AUTN after receiving the RAND and the AUTN, and after the AUTN is authenticated, calculates an RES as a response to the communications network element.

510: The UE sends the RES to the communications network element by using a message.

511: After receiving the RES, the communications network element authenticates whether the RES and an XRES in the AV are the same. If the RES and the XRES in the AV are the same, authentication succeeds; or if the RES and the XRES in the AV are different, an authentication failure is returned.

512: The communications network element sends SK_ID1 to the UE by using a message after authentication succeeds. In an optional manner, in this step, the communications network element may send SK_ID1 and GPK to the UE, where GPK is a global public key.

513: The UE sends a response to the communications network element. This step is an optional step. In this embodiment of the present invention, the UE may alternatively not send the response to the communications network element.

It should be noted herein that in the embodiment shown in FIG. 5, the communications network element may send the indicator to the HSS, the HSS may send the indicator to the communications network element when not performing a bit setting operation, and after performing a bit setting operation, the HSS may or may not send the indicator to the communications network element.

In the key distribution method based on a KMS of an operator provided in this embodiment of the present invention, the UE sends the indicator to the communications network element, the communications network element can learn, based on the indicator, that an authentication procedure of the UE needs to include identity-based key distribution, and the communications network element requests the subscriber private key from the KMS by using the HSS, and when authentication of the UE succeeds, distributes the subscriber private key to the UE after obtaining the subscriber private key generated by the KMS. In addition, in the key distribution method based on a KMS of an operator, because the KMS is deployed in the operator network, after authentication of the UE succeeds, the communications network element may directly distribute the subscriber private key to the UE without further authentication by the operator, thereby reducing communication overheads.

The procedure in FIG. 2 to FIG. 5 may further include the following procedure. The UE sends a key request to the KMS in a conventional AKA manner or the like after setting up a security link with a core network, where the key request includes the user identifier. After obtaining the identifier, the KMS generates the key SK_ID1 in the foregoing manner and sends SK_ID1 to the UE.

Figure 6:
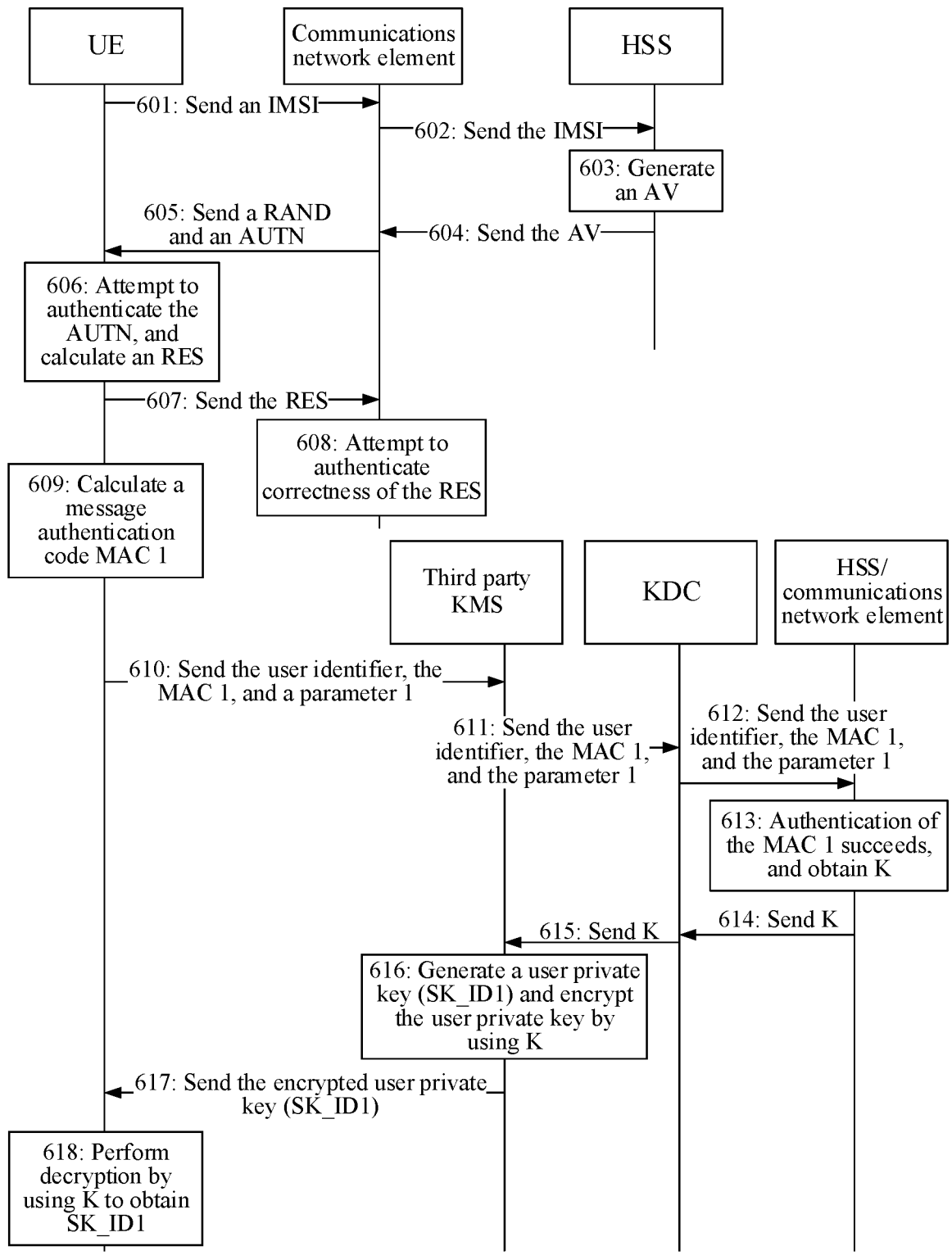
FIG. 6 is a flowchart of a key distribution method based on a KMS of a third party according to an embodiment of the present invention.

The following describes a key distribution method based on a KMS of a third party provided in an embodiment of the present invention. FIG. 6 is a flowchart of a key distribution method based on a KMS of a third party according to an embodiment of the present invention. In the key distribution method based on a KMS of a third party shown in FIG. 6, a KMS is deployed as an independent network element, and the KMS sends a message authentication code (MAC) from UE to an operator network element for authentication, and after the operator network element succeeds in authentication, distributes a subscriber private key to the UE.

Referring to FIG. 6, the key distribution method based on a KMS of a third party provided in this embodiment of the present invention may include:

601: UE sends an IMSI to a communications network element.

602: The communications network element sends the IMSI to an HSS.

603: The HSS generates an authentication vector (AV), where the AV=(RAND, AUTN, XRES, Kasme). The RAND is an authentication random number, the XRES is a response value, the AUTH is an authentication value, and the Kasme is an authenticated shared key.

604: After generating the AV, the HSS sends the AV to the communications network element.

605: After receiving the AV from the HSS, the communications network element sends the RAND and the AUTN to UE.

606: The UE attempts to authenticate the AUTN, and after the AUTN is authenticated, calculates an RES as a response to the communications network element.

607: The UE sends the RES to the communications network element by using a message.

608: After receiving the RES, the communications network element authenticates whether the RES and an XRES in the AV are the same. If the RES and the XRES in the AV are the same, authentication succeeds; or if the RES and the XRES in the AV are different, an authentication failure is returned.

609: The UE calculates a message authentication code MAC 1 based on a shared key (including, but not limited to, at least one of Kasme, a CK, and an IK) obtained after AKA authentication, and calculates K based on the shared key (including, but not limited to, at least one of Kasme, a CK, and an IK), where K is a key encrypting key. A calculation formula is, for example, as follows: the MAC 1=MAC ((at least one of Kasme, a CK, or an ID), (at least one of a user identifier and a parameter 1)), K=KDF((at least one of Kasme, a CK, or an ID), (at least one of user identifier and parameter 1), identifier of a KMS of a third party).

For descriptions of the user identifier, refer to the corresponding content below step 201.

The parameter 1 may be a random parameter, for example, a nonce, a sequence number (SQN), a connection identifier (connection ID), a fresh parameter, a random number, and the like.

610: UE 1 sends a user identifier, a MAC 1, and a parameter 1 to a KMS of a third party.

611: The third party KMS sends the user identifier, the MAC 1, and the parameter 1 to a key distribution center (KDC).

612: The KDC sends the user identifier, the MAC 1, and the parameter 1 to the HSS or the communications network element.

613: The HSS or the communications network element attempts to authenticate the MAC 1, and after authentication succeeds, may randomly generate or derive K based on the shared key (including, but not limited to, at least one of Kasme, CK, and IK), for example, K=KDF((at least one of Kasme, CK, or IK), (at least one of identifier of a KMS of a third party, user identifier, and parameter 1)).

If the HSS or the communications network element attempts to authenticate the MAC 1 by using the CK and/or the IK, the HSS or the communications network element needs to receive the CK and/or the IK in an AKA process.

614: The HSS/the communications network element sends K to the KDC.

615: The KDC sends K to the third party KMS.

616: The third party KMS generates a subscriber private key (SK_ID1) by using an identity-based algorithm, and encrypts SK_ID1 and GPK by using K.

The KMS may calculate SK_ID1 by using the following several identifiers: (1) a user identifier (ID1); (2) an operator identifier‖a user identifier, (ID‖ID1), where the operator identifier may be a public land mobile network identifier (PLMN ID), a serving network identifier (serving network ID), a local operator network identifier, or the like; and (3) an operator identifier‖a user identifier‖a time (ID‖ID1‖time) or a user identifier‖a time (ID1‖time).

617: The third party KMS sends the encrypted SK_ID1 and GPK to the UE.

618: The UE performs decryption by using K, to obtain SK_ID1 and GPK.

It should be noted herein that in the embodiment shown in FIG. 6, the KDC may alternatively not exist. In this way, the third party KMS may directly send the user identifier, the MAC 1, and the parameter 1 to the HSS/the communications network element. Meanwhile, optionally, the UE may not calculate K in step 609 but instead may calculate K after step 617.

In the key distribution method based on the third party KMS provided in this embodiment of the present invention, the KMS is deployed as an independent network element, and the KMS sends the MAC from the UE to the operator network element for authentication, and after the operator network element succeeds in authentication, generates the subscriber private key and distributes the subscriber private key to the UE. In the key distribution method based on the third party KMS, after AKA authentication of the UE succeeds, an operator further needs to perform authentication, thereby improving communication security.

Figure 7:
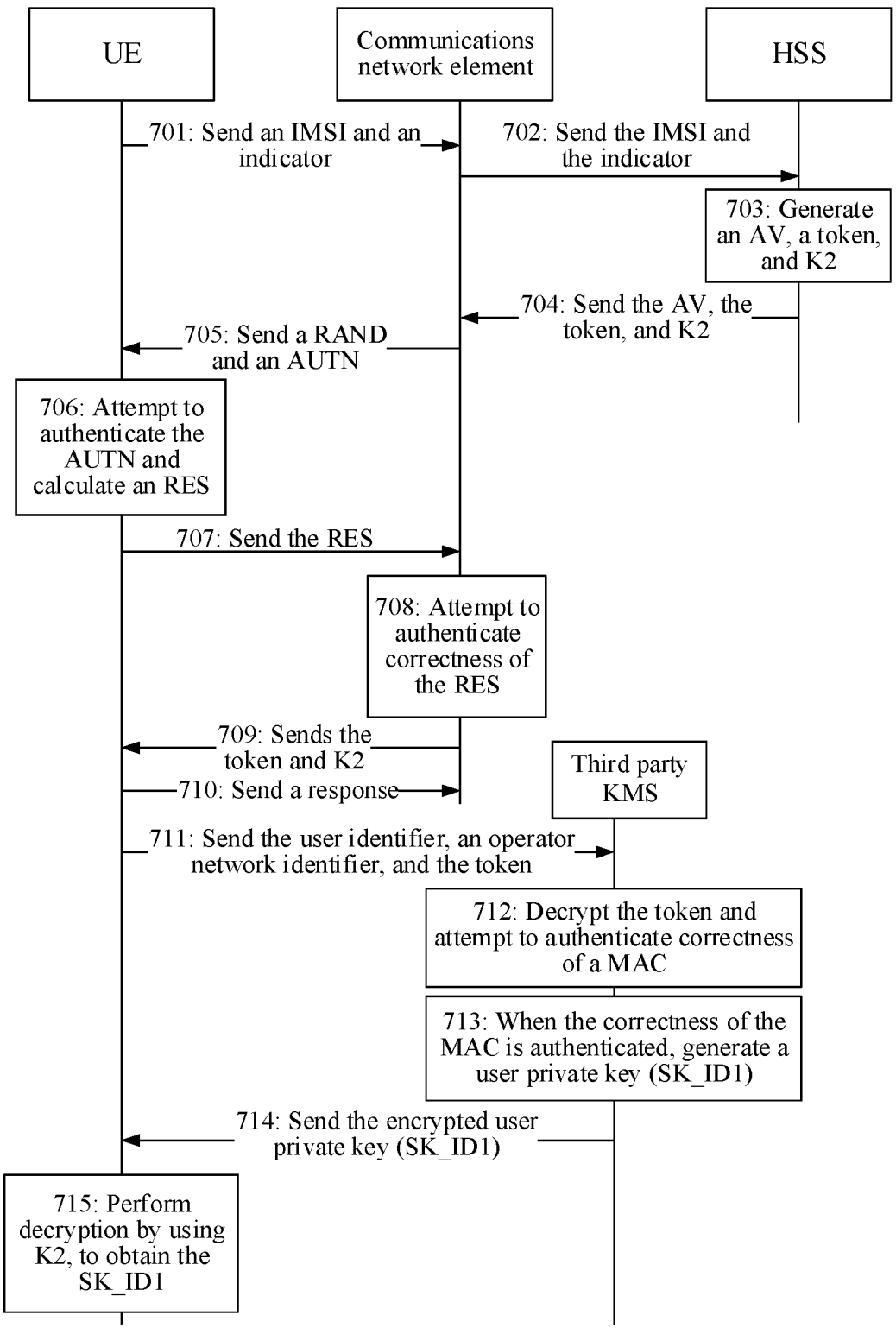
FIG. 7 is a flowchart of a key distribution method based on a KMS of a third party according to an embodiment of the present invention.

FIG. 7 is a flowchart of a key distribution method based on a KMS of a third party according to an embodiment of the present invention. In the key distribution method based on a KMS of a third party shown in FIG. 7, a KMS is deployed as an independent network element, and the KMS sends a token from UE to an operator network element for authentication, and after the operator network element succeeds in authentication, distributes a subscriber private key. In the embodiment shown in FIG. 7, an HSS and the third party KMS share a key K1.

Referring to FIG. 7, the key distribution method based on a KMS of a third party provided in this embodiment of the present invention may include:

701: UE initiates a request to a communications network element, where the request may carry an IMSI and an indicator. Optionally, the request may further carry a user identifier (ID1). In this embodiment of the present invention, the request may be specifically a user identity request, or certainly may be various self-defined requests. A specific request name is not limited in this embodiment of the present invention, provided that the request carries corresponding content.

For descriptions of the user identifier and the indicator, refer to corresponding content in step 201.

702: The communications network element receives the request sent by the UE, and sends the IMSI and the indicator from the UE to an HSS by using a message. Optionally, the communications network element may further send the user identifier to the HSS.

703: The HSS receives the IMSI and the indicator, and performs the following operation of calculating an authentication vector (AV) and calculating a token and K2. Optionally, the HSS may further receive the user identifier.

The communications network element and the HSS may learn, based on the indicator, that a key subsequently needs to be distributed.

K2 may be randomly generated or may be derived by using a subscriber root key, Kasme, CK, or IK. The AV= (RAND, AUTN, XRES, Kasme) and the token=Enc (K1, MAC (K1, (at least one of ID1, identifier of a third party KMS, and network ID)), K2). To be specific, the token is encryption on the MAC (K1, (at least one of ID1, identifier of a third party KMS, and network identifier)) and K2 by using the key K1. The MAC (K1, (at least one of ID1, ID of a third party KMS, and network ID)) indicates that a MAC is used for authentication protection of ID1, the identifier of the third party KMS, and the network identifier by using the key K1, and may be used by the third party KMS to perform authentication on message correctness. K1 is a shared key between the HSS and the third party KMS. K2 is used to encrypt communication between the UE and the third party KMS, to ensure security. The RAND is an authentication random number, the XRES is a response value, the AUTN is an authentication value, and the Kasme is an authenticated shared key.

Optionally, after receiving the indicator, in a process of generating the AV, the HSS may set an $X^{th}$ bit of an AMF parameter in the AUTN to 1, where $1 \leq X \leq 7$. In this way, the communications network element may subsequently determine, by using the parameter, whether an authentication procedure of the UE includes identity-based key distribution. Certainly, in this step, the HSS may alternatively not perform the operation of setting a bit of the AMF parameter, that is, does not set a bit of the AMF parameter, but instead may send the indicator to the communications network element. In this way, the communications network element may still determine subsequently whether the received message includes the indicator, to determine whether the authentication procedure of the UE includes identity-based key distribution.

If the message received by the HSS includes no indicator, it indicates that the authentication procedure of the UE includes no identity-based key distribution. In this case, the HS S performs authentication in a conventional AKA manner.

704: After generating the AV, the token, and K2, the HSS sends the AV, the token, and K2 to the communications network element by using a message.

As can be learned from steps 701 to 703, the communications network element may send the indicator to the HSS, the HSS may send the indicator to the communications network element when not performing a bit setting operation, and after performing a bit setting operation, the HSS may or may not send the indicator to the communications network element.

705: After receiving the AV, the token, and K2 from the HSS, the communications network element sends a RAND and an AUTN to the UE.

706: The UE attempts to authenticate the AUTN after receiving the RAND and the AUTN, and after the AUTN is authenticated, calculates an RES as a response to the communications network element.

707: The UE sends the RES to the communications network element by using a message.

708: After receiving the RES, the communications network element authenticates whether the RES and an XRES in the AV are the same. If the RES and the XRES in the AV are the same, authentication succeeds; or if the RES and the XRES in the AV are different, an authentication failure is returned.

709: After authentication succeeds, the communications network element sends the token and K2 to the UE by using a message.

710: The UE sends a response to the communications network element. This step is an optional step. In this embodiment of the present invention, the UE may alternatively not send the response to the communications network element.

711: The UE initiates a request and sends the user identifier, an operator network identifier, and the token to a third party KMS.

712: The third party KMS performs search by using the operator network identifier, to obtain the shared key K1, and decrypts the token by using the shared key K1, to obtain the MAC (K1, ID1, ID of a third party KMS, network ID) and K2. Subsequently, an attempt to authenticate correctness of the MAC is performed by using K1.

713: When=the correctness of the MAC is authenticated, the third party KMS generates a subscriber private key (SK_ID1) by using an identity-based algorithm, and encrypts SK_ID1 and GPK by using K2.

The KMS may calculate SK_ID1 by using the following several identifiers: (1) a user identifier (ID1); (2) an operator identifier||a user identifier, (ID||ID1), where the operator identifier may be a public land mobile network identifier (PLMN ID), a serving network identifier (serving network ID), a local operator network identifier, or the like; and (3) an operator ID||an ID1||a time or an ID1||a time.

714: The third party KMS sends the encrypted SK_ID1 and GPK to the UE.

715: The UE performs decryption by using K2, to obtain SK_ID1 and GPK.

In the key distribution method based on the third party KMS provided in this embodiment of the present invention, the KMS is deployed as an independent network element, after AKA authentication succeeds, the UE sends the MAC to the third party KMS, and the KMS sends the MAC from the UE to the operator network element for authentication, and after the operator network element succeeds in authentication, generates the subscriber private key and distributes the subscriber private key to the UE. In the key distribution method based on the third party KMS, after AKA authentication of the UE succeeds, an operator further needs to perform authentication, thereby improving communication security.

In all the foregoing embodiments, the message sent by the UE may carry no indicator, and the HSS may determine, based on a database of the HSS by using the IMSI or the user identifier, whether the UE requires identity-based key distribution. If determining that identity-based distribution is not required, the HSS performs a conventional AKA operation. If determining that identity-based key distribution is required, the HSS performs operations that are the same as those in all the foregoing embodiments. The operations include, but are not limited to: performing, by the HSS, a bit setting operation on the AMF parameter, and sending the AV only to the communications network element, so that the communications network element may determine, by using the bit setting operation, whether identity-based key distribution needs to be performed, or sending, by the HSS, an identifier 2 to the communications network element, to notify the communications network element that identity-based key distribution needs to be performed.

The authentication method provided in this embodiment of the present invention may include a three-round authentication method and a two-round authentication method. Three-round and two-round identify a quantity of times of message transfer between communications devices. The three-round authentication method may include the following manner: completing mutual authentication based on a MAC, completing mutual authentication based on encryption, and completing mutual authentication based on a signature. The two-round authentication method may include the following manner: completing mutual authentication based on a MAC and completing mutual authentication based on a signature.

The following first describes an authentication method based on a three-round authentication procedure provided in an embodiment of the present invention.

In the following embodiments, a session identifier is used to identify a session, and may be randomly selected, or may be derived based on a previous session identifier, for example, may be obtained by adding one to the previous session identifier. A nonce 1 may be randomly selected to represent freshness. A service identifier is an identifier of a service between UE 1 and UE 2.

In the following embodiments, the corresponding descriptions below step 201 may be applicable to both the first user identifier and the second user identifier.

Figure 8A:
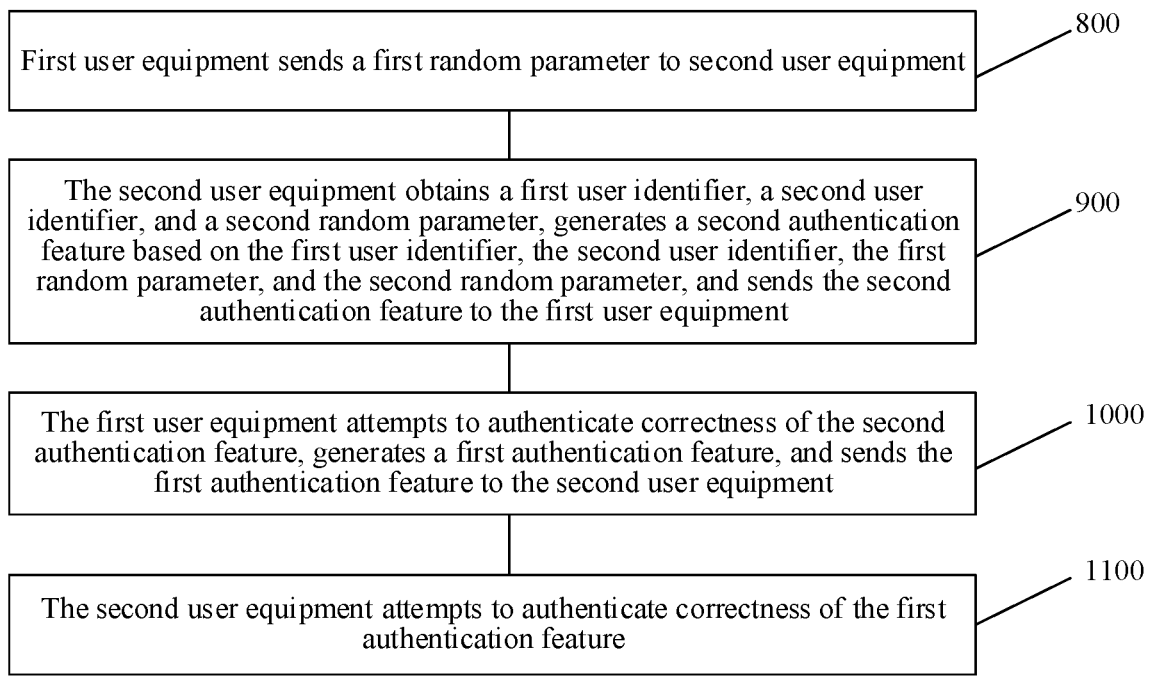
FIG. 8A is a flowchart of a three-round authentication method according to an embodiment of the present invention.

FIG. 8A is a flowchart of a three-round authentication method according to an embodiment of the present invention. Referring to FIG. 8 A, the three-round authentication method provided in this embodiment of the present invention may include:

800: First user equipment sends a first random parameter to second user equipment.

900: The second user equipment obtains a first user identifier, a second user identifier, and a second random parameter, generates a second authentication feature based on the first user identifier, the second user identifier, the first random parameter, and the second random parameter, and sends the second authentication feature to the first user equipment.

1000: The first user equipment attempts to authenticate correctness of the second authentication feature, generates a first authentication feature, and sends the first authentication feature to the second user equipment.

1100: The second user equipment attempts to authenticate correctness of the first authentication feature.

In the authentication method provided in this embodiment of the present invention, authentication is performed between two terminal devices by using a MAC, a ciphertext, or a digital signature, and in an authentication process, participation of an HSS is not required, so that an authentication flexibility requirement of a service can be satisfied.

Figure 9:
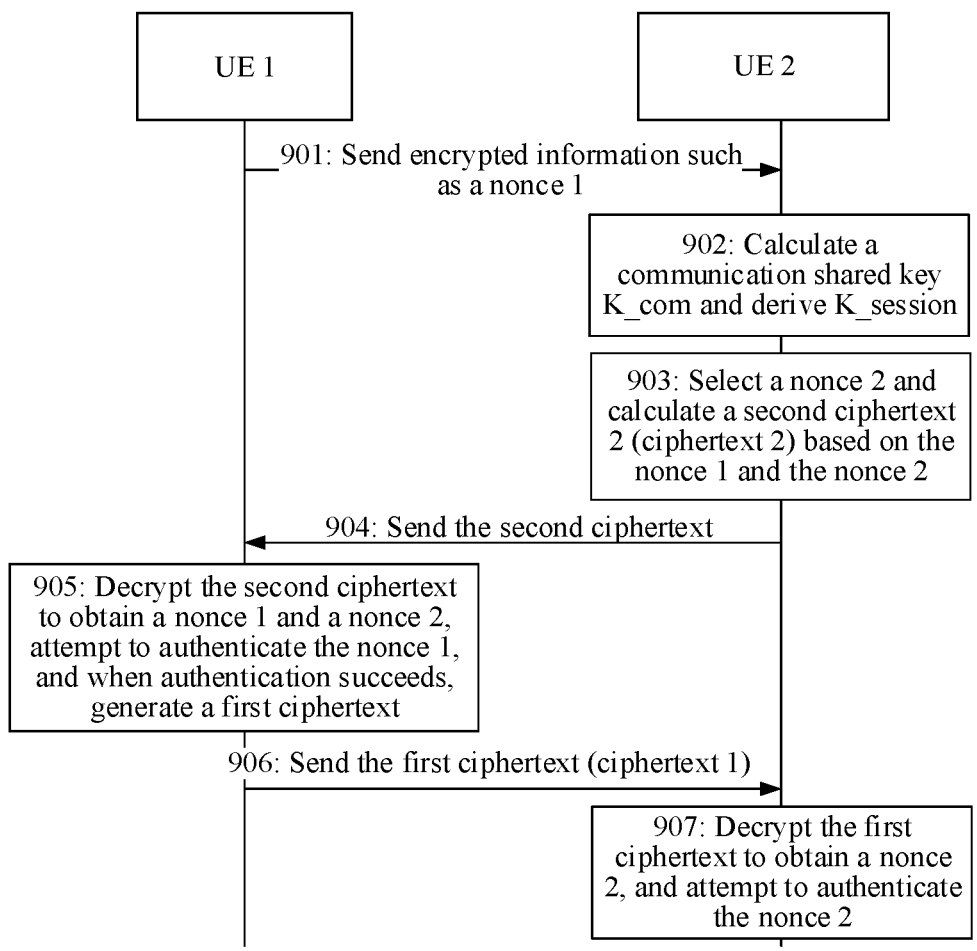
FIG. 9 is a schematic diagram of a three-round authentication method for mutual authentication based on encryption according to an embodiment of the present invention.
Figure 10:
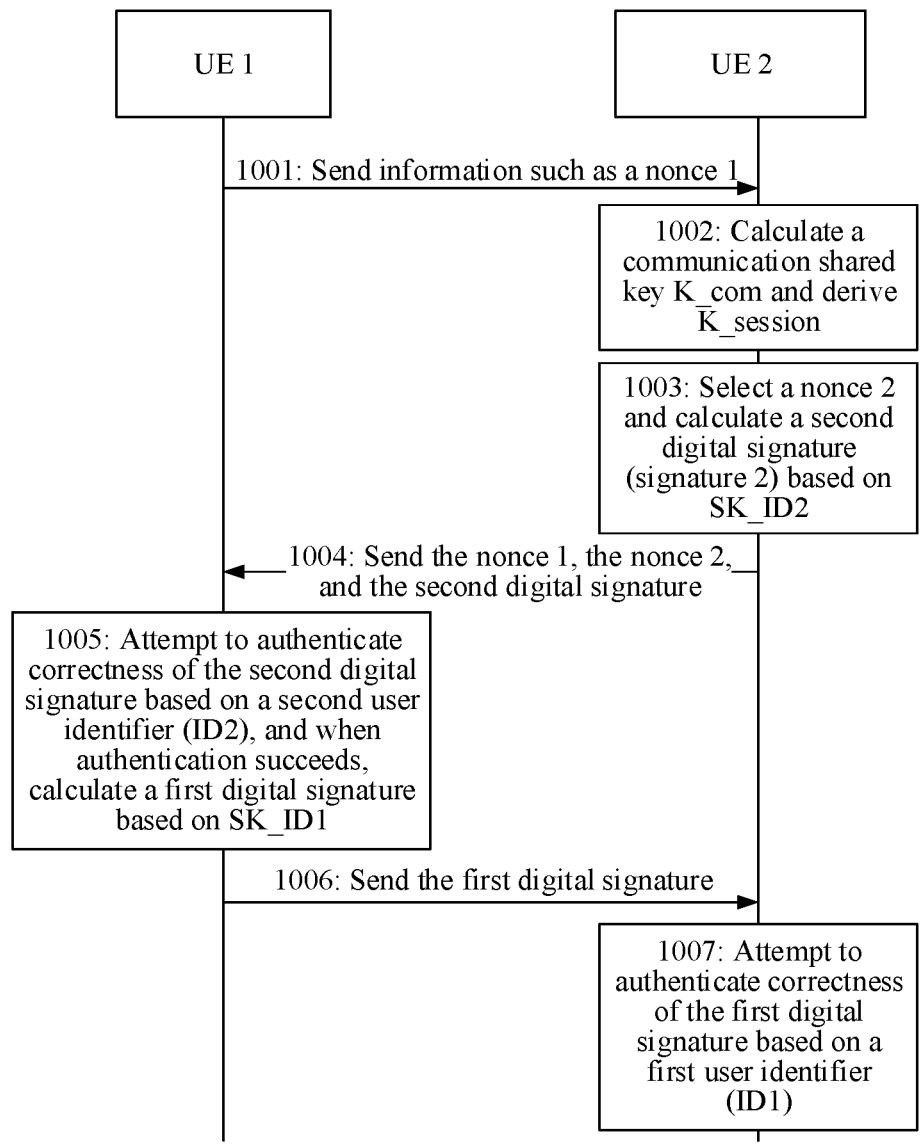
FIG. 10 is a schematic diagram of a three-round authentication method for mutual authentication based on a signature according to an embodiment of the present invention.
Figure 11:
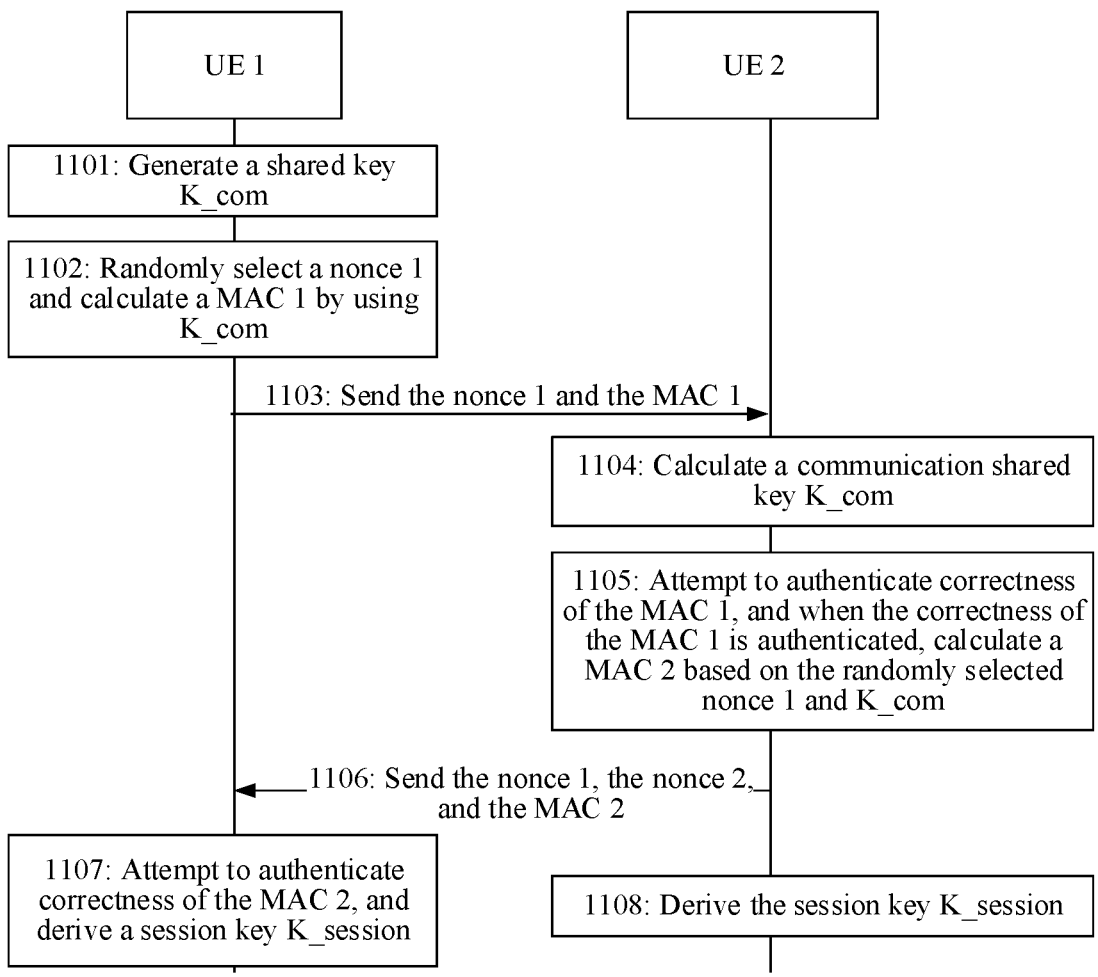
FIG. 11 is a schematic diagram of a two-round authentication method for mutual authentication based on a MAC according to an embodiment of the present invention.
Figure 12:
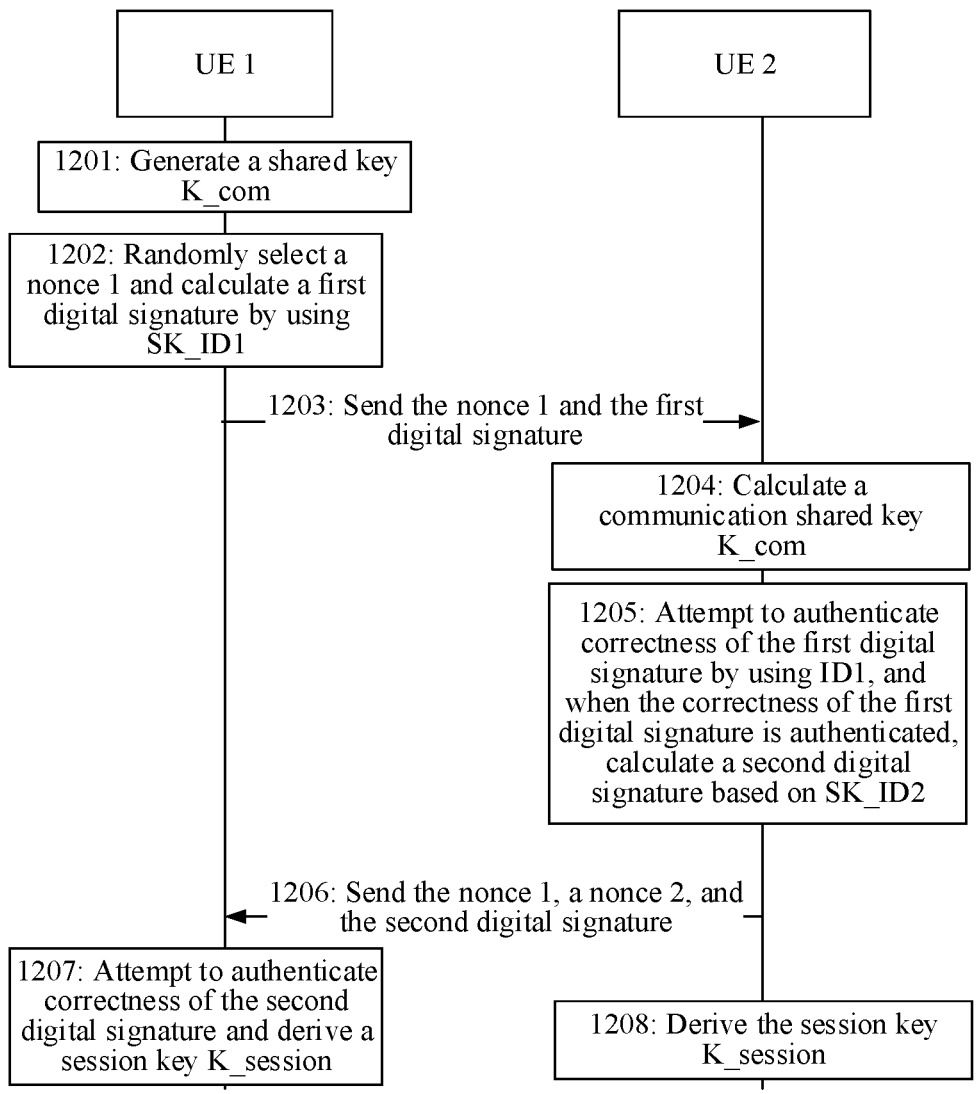
FIG. 12 is a schematic diagram of a two-round authentication method for mutual authentication based on a signature according to an embodiment of the present invention.

The following further describes the authentication method provided in this embodiment of the present invention with reference to FIG. 8B to FIG. 12. FIG. 11 and FIG. 12 are schematic diagrams of authentication methods based on a two-round authentication procedure.

Figure 8B:
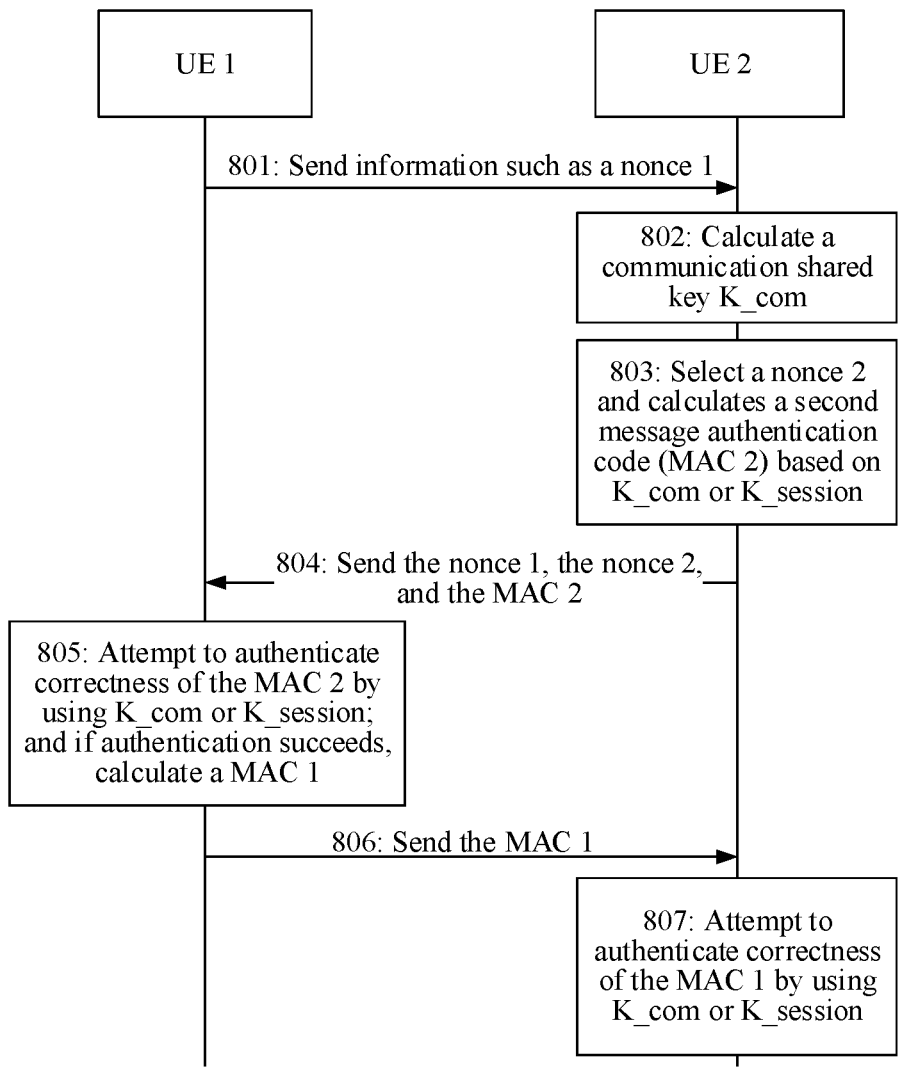
FIG. 8B is a schematic diagram of a three-round authentication method for mutual authentication based on a MAC according to an embodiment of the present invention.

FIG. 8B is a flowchart of a third-round authentication method for mutual authentication based on a MAC according to an embodiment of the present invention. In the embodiment shown in FIG. 8B, the UE 1 may have a first user identifier (ID1), a first subscriber key (SK_ID1), and a global public key (GPK), and the UE 2 may have a second user identifier (ID2), a second subscriber key (SK_ID2), and a global public key (GPK).

Referring to FIG. 8B, a three-round authentication method based on a three-round authentication procedure provided in an embodiment of the present invention may include:

801: UE 1 sends a session identifier (session ID), a first random parameter (nonce 1), a first user identifier (ID1), and a service identifier (service ID) to UE 2, and may further send a second user identifier (ID2).

802: The UE 2 calculates a communication shared key (K_com) based on GPK, ID2, SK_ID2, and ID1. GPK and SK_ID2 may be obtained in advance in a key distribution stage.

There may be the following two calculation formulas:

(1) K_com=e(xH(ID1), H(ID2)), or K_com=H (e(xH (ID1), H(ID2)).

Specifically, if a user 1 and a user 2 want to perform secure communication, parameters are as follows: an identity of the user 1 is ID1, an identity-based private key of the user 1 is SK_ID1=xH(ID1), an identity of the user 2 is ID2, and an identity-based private key of the user 2 is SK_ID2=xH(ID2). The user 1 and the user 2 can calculate a unique shared key (K_com)=e(xH(ID1), H(ID2)) of the user 1 and the user 2 without exchanging a message.

(2) K_com=H (e(xH(ID1), H(ID2))^{H (a parameter 1)}). In this case, the key K is bound with the parameter 1. The parameter 1 may be at least one of a service identifier, a slice ID, a link ID, a connection identifier (connection ID), a session identifier (session ID), a serving network identifier (serving network ID), a public land mobile network identifier (PLMN ID), ID 1, and ID2. The H( ) algorithm may be a Hash( ) algorithm or may be an HMAC( ) algorithm.

803: The UE 2 randomly selects a second random parameter (nonce 2), derives a session key (K_session) by using the communication shared key (K_com), and calculates a second message authentication code (MAC 2) based on K_com or K_session.

K_session=KDF (K_com, (at least one of session identifier, nonce 1, nonce 2, service identifier, first user identifier, and second user identifier)), and the MAC 2=MAC (K_com or K_session, (at least one of nonce 1 and nonce 2), (at least one of session identifier, first user identifier, second user identifier, service identifier, slice identifier, link identifier, connection identifier, serving network identifier, and PLMN ID)).

804: The UE 2 sends the session identifier, the nonce 1, the nonce 2, and the MAC 2 to the UE 1. Optionally, the UE 2 may further send the service identifier and ID2 to the UE 1.

805: The UE 1 generates a shared key (K_com) based on GPK, ID1, SK_ID1, and ID2 by using a parameter input that is the same as that of the UE 2, and derives K_session by using a parameter input that is the same as that of the UE 2. The UE 1 attempts to authenticate correctness of the MAC 2 by using K_com or K_session; and if authentication succeeds, calculates a MAC 1, or if authentication does not succeed, does not calculate the MAC 1. Success of authentication indicates that the message is not tampered.

The MAC 1=MAC (K_com or K_session, (at least one of nonce 1 and nonce 2), (at least one of session identifier, ID1, ID2, service identifier, slice ID, link ID, connection identifier, serving network identifier, and PLMN ID)).

A key used to attempt to authenticate correctness of the MAC 2 is the same as the key used to calculate the MAC 2 in step 803.

806: The UE 1 sends the MAC 1 to the UE 2.

807: The UE 2 attempts to authenticate correctness of the MAC 1 by using K_com or K_session.

In the embodiment shown in FIG. 8, a MAC (including the MAC 1 and the MAC 2) may be calculated based on K_com or K_session. In either manner, a same key needs to be used to calculate the MAC and perform authentication on the MAC.

In the authentication method based on a three-round authentication procedure provided in this embodiment of the present invention, the UE 1 attempts to authenticate the MAC 2 from the UE 2 by using K_com or K_session, and subsequently the UE 2 attempts to authenticate a MAC from the UE 1 by using K_com or K_session. In this way, mutual authentication can be completed based on the MACs, and an authentication flexibility requirement of a service can be satisfied.

FIG. 9 is a flowchart of a three-round authentication method for mutual authentication based on encryption according to an embodiment of the present invention. In the embodiment shown in FIG. 9, UE 1 may have a first user identifier (ID1), a first subscriber key(SK_ID1), and a global public key (GPK), and UE 2 may have a second user identifier (ID2), a second subscriber key(SK_ID2), and a global public key (GPK). In the embodiment shown in FIG. 9, the UE 1 and the UE 2 calculate ciphertexts of the UE 1 and the UE 2 to prove authenticity to the other party.

Referring to FIG. 9, a three-round authentication method based on a three-round authentication procedure provided in an embodiment of the present invention may include:

901: UE 1 sends a session identifier (session ID), a first user identifier (ID1), a service identifier (service ID), and En (ID2, nonce 1) to the UE 2, and may further send a second user identifier (ID2).

The En(ID2, nonce 1) may be encrypted in two manners: encryption based on a shared key K, where the UE 1 first needs to generate a shared key (K_com); and identity-based encryption, where the nonce 1 is encrypted by using ID2.

902: The UE 2 calculates a shared key (K_com) based on GPK, ID2, SK_ID2, and ID1. There may be the following two calculation formulas:

(1) K_com=e(xH(ID1), H(ID2)), or K_com=H (e(xH (ID1), H(ID2)).

Specifically, if a user 1 and a user 2 want to perform secure communication, parameters are as follows: an identity of the user 1 is ID1, an identity-based private key of the user 1 is SK_ID1=xH(ID1), an identity of the user 2 is ID2, and an identity-based private key of the user 2 is SK_ID2=xH(ID2). The user 1 and the user 2 can calculate a unique shared key (K_com)=e(xH(ID1), H(ID2)) of the user 1 and the user 2 without exchanging a message.

K_com=H(e(xH(ID1), H(ID2))^{H (parameter 1)}), where the key K is bound with the parameter 1, the parameter 1 may be at least one of a service identifier, a slice identifier, a link identifier, a connection identifier, a session identifier, a serving network identifier, a public land mobile network identifier, the first user identifier, and the second user identifier, and the H( ) algorithm may be a Hash( ) algorithm or may be an HMAC( ) algorithm.

903: The UE 2 obtains a nonce 1, randomly selects a nonce 2, and calculates a second ciphertext (ciphertext 2) based on the nonce 1 and the nonce 2. The ciphertext 2=En(ID1, ID2, nonce 1, nonce 2).

If the En(ID2, nonce 1) is encryption based on the shared key (K_com), the UE 2 needs to first generate the shared key (K_com), and then performs decryption to obtain the nonce 1. If the En(ID2, nonce 1) is encryption based on the identity ID2, the UE 2 performs decryption to obtain the nonce 1 by using SK_ID2.

Optionally, in step 903, the UE 2 may further derive a session key (K_session)=KDF (K_com, (at least one of session identifier, nonce 1, nonce 2, service identifier, ID1, and ID2)) by using the shared key (K_com).

The second ciphertext (ciphertext 2) may be obtained by encryption in the following manners: encrypting ID1, ID2, the nonce 1, and the nonce 2 based on the shared key (K_com), to obtain the second ciphertext (ciphertext 2); performing identity-based encryption, and encrypting ID1, ID2, the nonce 1, and the nonce 2 by using ID1 to obtain the second ciphertext (ciphertext 2); and encrypting ID1, ID2, the nonce 1, and the nonce 2 based on the session key (K_session) to obtain the second ciphertext (ciphertext 2).

904: The UE 2 sends the first user identifier (ID1), the second user identifier (ID2), and the second ciphertext (ciphertext 2) to the UE 1.

905: After receiving ID1, ID2, and the second ciphertext (ciphertext 2), the UE 1 decrypts the second ciphertext (ciphertext 2) to obtain the nonce 1 and a second random parameter, and attempts to authenticate the nonce 1. When authentication succeeds, the UE 1 generates a first ciphertext (ciphertext 1), where ciphertext 1=En(ID1, ID2, nonce 2).

When the ciphertext 2 is decrypted, if the ciphertext 2 is encrypted based on the shared key K, the UE 1 first needs to generate the shared key (K_com), and then performs decryption to obtain the nonce 1 and the nonce 2. If the ciphertext 2 is encrypted based on an identity, the UE 1 performs decryption to obtain the nonce 1 and the nonce 2 by using SK_ID1. If the ciphertext 2 is encrypted based on the shared key (K_session), the UE 1 first needs to generate the shared key (K_com), then generates K_session, and performs decryption to obtain the nonce 1 and the nonce 2.

After obtaining the nonce 1 and the nonce 2 by decryption, the UE 1 determines whether the nonce 1 and the encrypted nonce 1 in step 901 are the same. If the nonce 1 and the encrypted nonce 1 in step 901 are the same, authentication succeeds, and the first ciphertext (ciphertext 1) is generated. If the nonce 1 and the encrypted nonce 1 in step 901 are different, authentication fails, and the first ciphertext may not be generated.

Optionally, the UE 1 may generate the shared key (K_com) based on GPK, ID1, SK_ID1, and ID2 by using a parameter input that is the same as that of the UE 2, and then derive K_session by using the parameter input that is the same as that of the UE 2.

The ciphertext 1 may be obtained by encryption in the following manners: encrypting ID1, ID2, and the nonce 2 based on the shared key (K_com), to obtain the first ciphertext (ciphertext 1); performing identity-based encryption, and encrypting ID1, ID2, and the nonce 2 by using ID2 to obtain the first ciphertext (ciphertext 1); and encrypting ID1, ID2, and the nonce 2 based on the session key (K_session) to obtain the first ciphertext (ciphertext 1).

906: The UE 1 sends the first ciphertext (ciphertext 1) to the UE 2.

907: The UE 2 decrypts the first ciphertext by using SK_ID2, K_com, or K_session, to obtain the nonce 2 by decryption, and determines whether the nonce 2 obtained by decryption and the encrypted nonce 2 in step 903 are the same. If the nonce 2 obtained by decryption and the encrypted nonce 2 in step 903 are the same, authentication of the UE 1 succeeds.

It should be noted that in the embodiment shown in FIG. 9, the nonce 1 may not need to be encrypted in step 901, and the UE 1 directly sends the nonce 1 to the UE 2. Optionally, in step 906, the nonce 2 may alternatively not be encrypted and is directly sent by the UE 1 to the UE 2.

In the authentication method based on a three-round authentication procedure provided in this embodiment of the present invention, the UE 1 attempts to authenticate the second ciphertext (ciphertext 2) from the UE 2 by using the shared key (K_com) or SK_ID1, and subsequently the UE 2 attempts to authenticate the first ciphertext (ciphertext 1) from the UE 1 by using SK_ID2 or the shared key (K_com). In this way, mutual authentication can be completed based on encryption, and an authentication flexibility requirement of a service can be satisfied.

FIG. 10 is a flowchart of a third-round authentication method for mutual authentication based on a signature according to an embodiment of the present invention. In the embodiment shown in FIG. 10, UE 1 may have a first user identifier (ID1), a first subscriber key (SK_ID1), and a global public key (GPK), and UE 2 may have a first user identifier (ID2), a second subscriber key (SK_ID2), and a global public key (GPK). In the embodiment shown in FIG. 10, UE 1 and the UE 2 prove authenticity to the other party by using digital signatures of the UE 1 and the UE 2.

A difference between this embodiment and the embodiment shown in FIG. 8 lies in that in this embodiment, a digital signature is used to replace the MAC in the embodiment shown in FIG. 8.

Referring to FIG. 10, a three-round authentication method based on a three-round authentication procedure provided in an embodiment of the present invention may include:

1001: UE 1 sends a session identifier (session ID), a nonce 1, ID1, and a service identifier (service ID) to UE 2, and may further send a second user identifier (ID2).

1002: The UE 2 obtains the nonce 1 and randomly selects a nonce 2. The UE 2 may calculate K_com by using a same manner as that in the foregoing embodiment, and derive K_session=KDF ((at least one of K_com, nonce 1, and nonce 2), (at least one of session identifier, first user identifier, second user identifier, service identifier, slice identifier, link identifier, connection identifier, serving network identifier, and public land mobile network identifier)).

1003: The UE 2 calculates a second digital signature (signature 2) based on a second subscriber key (SK_ID2), where the signature 2=Sign (SK_ID2, (at least one of nonce 1 and nonce 2), (at least one of session identifier, first user identifier, second user identifier, service identifier, slice identifier, link identifier, connection identifier, serving network identifier, and public land mobile network identifier)).

1004: The UE 2 sends the nonce 1, the nonce 2, and the second digital signature (signature 2) to the UE 1, and may further send at least one of ID1 and ID2.

1005: The UE 1 attempts to authenticate correctness of the second digital signature (signature 2) based on the second user identifier (ID2). When the correctness of the second digital signature is authenticated, the UE calculates a first digital signature (signature 1) based on a first subscriber key (SK_ID1). The signature 1=Sign (SK_ID1, (at least one of nonce 1 and nonce 2), (at least one of session identifier, first user identifier, second user identifier, service identifier, slice identifier, link identifier, connection identifier, serving network identifier, and public land mobile network identifier)). If the second digital signature fails to be authenticated, the first digital signature may not be calculated.

Meanwhile, the UE 1 may calculate K_com and K_session in the same manner.

1006: The UE 1 sends the first digital signature (signature 1) to the UE 2.

1007: The UE 2 attempts to authenticate correctness of the first digital signature (signature 1) based on the first user identifier (ID1). After authentication succeeds, the UE 1 and the UE 2 share K_session. In addition, a communication session between the UE 1 and the UE 2 may be encrypted by using K_session, to ensure security.

In the authentication method based on a three-round authentication procedure provided in this embodiment of the present invention, the UE 1 attempts to authenticate correctness of the second digital signature (signature 2) based on ID2, and the UE 2 attempts to authenticate correctness of the first digital signature (signature 1) based on ID1. In this way, mutual authentication can be completed based on the digital signatures, and an authentication flexibility requirement of a service is satisfied.

The following describes an authentication method based on a two-round authentication procedure provided in an embodiment of the present invention.

FIG. 11 is a flowchart of a two-round authentication method for mutual authentication based on a MAC according to an embodiment of the present invention. In the embodiment shown in FIG. 11, UE 1 may have a first user identifier (ID1), a first subscriber key (SK_ID1), and a global public key (GPK), and UE 2 may have a second user identifier (ID2), a second subscriber key (SK_ID2), and a global public key (GPK).

The authentication procedure in the embodiment shown in FIG. 11 is approximately similar to that in the embodiment shown in FIG. 8. A difference lies in that after receiving a first message from the UE 1, the UE 2 may perform authentication on legality of the UE 1. In the three-round authentication shown in FIG. 8, the UE 2 attempts to authenticate legality of the UE 1 only after receiving a second message from the UE 1.

Referring to FIG. 11, the authentication method based on the two-round authentication procedure provided in an embodiment of the present invention may include:

1101: UE 1 generates a shared key (K_com).

There may be the following two calculation formulas:

(1) K_com=e(xH(ID1), H(ID2)), or K_com=H (e(xH(ID1), H(ID2)).

Specifically, if a user 1 and a user 2 want to perform secure communication, parameters are as follows: an identity of the user 1 is ID1, an identity-based private key of the user 1 is SK_ID1=sH(ID1), an identity of the user 2 is ID2, and an identity-based private key of the user 2 is SK_ID2=sH(ID2). The user 1 and the user 2 can calculate a unique shared key K=e(xH(ID1), H(ID2)) of the user 1 and the user 2 without exchanging a message.

K_com=H(e(xH(ID1), H(ID2))^{H (parameter 1)}), where the key K is bound with the parameter 1, the parameter 1 may be at least one of a service identifier, a slice identifier, a link identifier, a connection identifier, a session identifier, a serving network identifier, a public land mobile network identifier, the first user identifier, and the second user identifier, and the H( ) algorithm may be a Hash( ) algorithm or may be an HMAC( ) algorithm.

1102: The UE 1 randomly selects a nonce 1 and calculates a MAC 1 by using K_com.

The MAC 1=MAC (K_com, nonce 1, (at least one of session identifier, ID1, ID2, service identifier, slice ID, link ID, connection identifier, session identifier, serving network identifier, public land mobile network identifier, first user identifier, and second user identifier)).

1103: The UE 1 sends a session identifier, the nonce 1, a first user identifier, a second user identifier, and the MAC 1 to UE 2.

1104: The UE 2 generates K_com.

There may be the following two calculation formulas:

(1) K_com=e(xH(ID1), H(ID2)), or K_com=H (e(xH(ID1), H(ID2)).

Specifically, if a user 1 and a user 2 want to perform secure communication, parameters are as follows: an identity of the user 1 is ID1, an identity-based private key of the user 1 is SK_ID1=sH(ID1), an identity of the user 2 is ID2, and an identity-based private key of the user 2 is SK_ID2=sH(ID2). The user 1 and the user 2 can calculate a unique shared key K=e(xH(ID1), H(ID2)) of the user 1 and the user 2 without exchanging a message.

K_com=H(e(xH(ID1), H(ID2))^{H (parameter 1)}), where the key K is bound with the parameter 1, the parameter 1 may be at least one of a service identifier, a slice identifier, a link identifier, a connection identifier, a session identifier, a serving network identifier, a public land mobile network identifier, the first user identifier, and the second user identifier, and the H( ) algorithm may be a Hash( ) algorithm or may be an HMAC( ) algorithm.

1105: The UE 2 attempts to authenticate correctness of the MAC 1, and when the correctness of the MAC 1 is authenticated, calculates a MAC 2 based on a randomly selected nonce 2 and K_com.

The MAC 2=MAC (K_com, nonce 1, nonce 2, (at least one of session identifier, ID1, ID2, service identifier, slice ID, link ID, connection identifier, session identifier, serving network identifier, public land mobile network identifier, first user identifier, and second user identifier)).

1106: The UE 2 sends the nonce 1, the nonce 2, the first user identifier, the second user identifier, and the MAC 2 to the UE 1.

1107: The UE 1 attempts to authenticate correctness of the MAC 2, and derives a session key (K_session)=KDF (K_com, (at least one of session identifier, nonce 1, nonce 2, service identifier, ID1, and ID2)).

1108: The UE 2 derives a session key (K_session)=KDF (K_com, (at least one of session identifier, nonce 1, nonce 2, service identifier, ID1, and ID2)).

Optionally, a sequence of performing step 1108 may be adjusted, and step 1108 may be performed in any step after step 1104.

Optionally, in step 1101 or step 1102, the UE 1 may further calculate K_session. In this case, the parameter of the nonce 2 is not included when K_session is derived, and the UE 1 may subsequently calculate the MAC 1 based on K_session. Correspondingly, the UE 2 calculates K_com and K_session, attempts to authenticate correctness of the MAC 1 by using K_session, and after authentication succeeds, calculates the MAC 2 based on K_session and sends the MAC 2 to the UE 1, so that the UE 1 attempts to authenticate authenticity of the MAC 2, to complete mutual authentication.

In the authentication method based on a two-round authentication procedure provided in this embodiment of the present invention, the UE 2 attempts to authenticate a MAC from the UE 1 by using K_com or K_session, and subsequently the UE 1 attempts to authenticate the MAC 2 from the UE 2 by using K_com or K_session. In this way, mutual authentication can be completed based on the MAC, and an authentication flexibility requirement of a service can be satisfied.

FIG. 12 is a flowchart of a two-round authentication method for mutual authentication based on a signature according to an embodiment of the present invention. In the embodiment shown in FIG. 12, the UE 1 may have a first user identifier (ID1), a first subscriber key (SK_ID1), and a global public key (GPK), and the UE 2 may have a second user identifier (ID2), a second subscriber key (SK_ID2), and a global public key (GPK).

The authentication procedure in the embodiment shown in FIG. 12 is approximately similar to that in the embodiment shown in FIG. 11. A difference lies in that in the embodiment, a digital signature is used to replace the MAC in the embodiment shown in FIG. 11.

Referring to FIG. 12, a three-round authentication method based on a two-round authentication procedure provided in an embodiment of the present invention may include:

1201: UE 1 generates K_com in the same manner as that in the foregoing embodiment.

1202: The UE 1 randomly selects a nonce 1, and calculates a first digital signature (signature 1) by using SK_ID1. The signature 1=Sign (SK_ID1, (at least one of nonce 1, session identifier, ID1, ID2, service identifier, slice ID, link ID, connection identifier, session identifier, serving network identifier, and PLMN ID)).

1203: The UE 1 sends the session identifier, the nonce 1, ID1, ID2, and the first digital signature (signature 1) to UE 2.

1204: The UE 2 generates K_com in the same manner.

1205: The UE 2 attempts to authenticate correctness of the first digital signature (signature 1) by using ID1, and after authentication succeeds, calculates a second digital signature (signature 2) by using SK_ID2. The signature 2=Sign (SK_ID2, (at least one of nonce 1 and nonce 2), (at least one of session identifier, ID1, ID2, service identifier, slice ID, link ID, connection identifier, serving network identifier, and PLMN ID)).

1206: The UE 2 sends the nonce 1, the nonce 2, the first user identifier, the second user identifier, and the second digital signature (signature 2) to the UE 1.

1207: The UE 1 attempts to authenticate correctness of the second digital signature (signature 2), and derives a session key (K_session)=KDF (K_com, (at least one of session identifier, nonce 1, nonce 2, service identifier, ID1, and ID2)).

1208: The UE 2 derives a session key (K_session)=KDF (K_com, (at least one of session identifier, nonce 1, nonce 2, service identifier, ID1, and ID2)).

Optionally, step 1208 of deriving the session key (K_session) may be performed in any step after step 1204.

Optionally, in step 1201 or step 1202, the UE 1 may further calculate K_session. In this case, the parameter of the nonce 2 is not included when K_session is derived. Correspondingly, the UE 2 calculates K_com, and calculates K_session in the same manner as that of the UE 1.

In the authentication method based on a two-round authentication procedure provided in this embodiment of the present invention, the UE 2 attempts to authenticate correctness of the first digital signature (signature 1) based on ID1, and the UE 1 attempts to authenticate correctness of the second digital signature (signature 2) based on ID2. In this way, mutual authentication can be completed based on the digital signature, and an authentication flexibility requirement of a service is satisfied.

It should be noted that the foregoing embodiments are all based on a session. A session identifier (session ID) is added to a sent message, and a parameter of a session identifier is also added in key deriving and authentication. The foregoing manner also supports a slice, flow (flow), and bearer mode. To be specific, a slice ID, a flow identifier, or a bearer ID is added to a sent message, and the parameter of the slice ID, the flow identifier, or the bearer ID is also added in key deriving and authentication.

Figure 13:
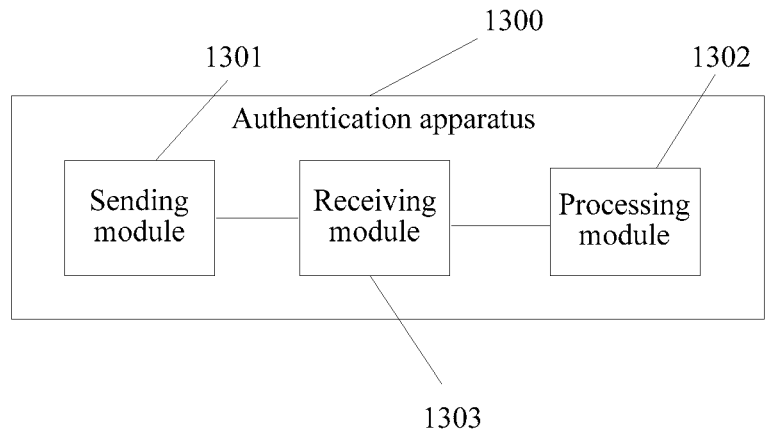
FIG. 13 is a structural block diagram of an authentication device according to an embodiment of the present invention.

FIG. 13 is a structural block diagram of an authentication apparatus according to an embodiment of the present invention. Referring to FIG. 13, the authentication apparatus 1300 includes a sending module 1301, a receiving module 1302, and a processing module 1303.

The sending module 1301 is configured to send a first random parameter to second user equipment.

The receiving module 1302 is configured to receive a second authentication feature from the second user equipment.

The processing module 1303 is configured to: attempt to authenticate correctness of the second authentication feature, and generate a first authentication feature.

The sending module 1301 is further configured to send the first authentication feature to the second user equipment.

In a case, the authentication feature is a message authentication code. In this case, before the first authentication feature is generated, the receiving module 1302 is further configured to: receive the first random parameter and the second random parameter from the second user equipment.

The processing module 1303 is specifically configured to: obtain the first user identifier and the second user identifier, generate a communication shared key (K_com) and/or a session key (K_session) based on the first user identifier and the second user identifier, and generate a first MAC based on the communication shared key (K_com) or the session key (K_session), the first random parameter, and the second random parameter, where K_com=H (e(xH(ID1), H(ID2))^{H (parameter 1)}), where the parameter 1 may be at least one of a service identifier, a slice identifier, a link identifier, a connection identifier, a session identifier, a serving network identifier, a public land mobile network identifier, the first user identifier, and the second user identifier, and the H( ) algorithm is a Hash( ) algorithm or an HMAC( ) algorithm;

K_session=KDF (K_com, (at least one of session identifier, first random parameter, second random parameter, service identifier, first user identifier, and second user identifier)); and the first MAC=MAC (K_com or K_session, (at least one of first random parameter and second random parameter), (at least one of session identifier, first user identifier, second user identifier, service identifier, slice identifier, link identifier, connection identifier, serving network identifier, and public land mobile network identifier)), where the session identifier, the service identifier, the slice identifier, the link identifier, the connection identifier, the serving network identifier, and the public land mobile network identifier are obtained by the first user equipment in advance or received from the first user equipment.

In a case, the authentication feature is a ciphertext. In this case, the processing module 1303 is specifically configured to:

decrypt a second ciphertext by using a first subscriber key, a communication shared key (K_com), or a session key (K_session), to obtain a first random parameter and a second random parameter, and determining whether the first random parameter obtained by decryption is the same as the first random parameter previously sent to the second user equipment, where if the first random parameter obtained by decryption is the same as the first random parameter previously sent to the second user equipment, authentication succeeds, where K_com=e(xH(ID1), H(ID2)), K_com=H (e(xH(ID1), H(ID2)), or K_com=H (e(xH(ID1), H(ID2))^{H (parameter 1)}), where the parameter 1 may be at least one of a service identifier, a slice identifier, a link identifier, a connection identifier, a session identifier, a serving network identifier, a public land mobile network identifier, the first user identifier, and the second user identifier, and the H( ) algorithm is a Hash( ) algorithm or an HMAC( ) algorithm; and K_session=KDF (K_com, (at least one of session identifier, first random parameter, second random parameter, service identifier, first user identifier, and second user identifier)).

When the authentication feature is a ciphertext, the processing module 1303 is specifically configured to:

obtain the first user identifier and the second user identifier, and encrypt the first user identifier, the second user identifier, and the second random parameter by using the first user identifier, the communication shared key (K_com), or the session key (K_session), to generate a first ciphertext.

In a case, the authentication feature is a digital signature. In this case, the receiving module 1302 is further configured to: receive the first random parameter and the second random parameter from the second user equipment.

The processing module 1303 is specifically configured to calculate a first digital signature based on the first random parameter, the second random parameter, and a first subscriber key, where the first digital signature=Sign (SK_ID2, (at least one of first random parameter and second random parameter), (at least one of session identifier, first user identifier, second user identifier, service identifier, slice identifier, link identifier, connection identifier, serving network identifier, and public land mobile network identifier)), where the session identifier, the service identifier, the slice identifier, the link identifier, the connection identifier, the serving network identifier, and the public land mobile network identifier are obtained by the second user equipment in advance or received from the first user equipment.

In the authentication apparatus provided in this embodiment of the present invention, authentication is performed between two terminal devices by using a MAC, a ciphertext, or a digital signature, and in an authentication process, participation of an HSS is not required, so that an authentication flexibility requirement of a service can be satisfied.

Figure 14:
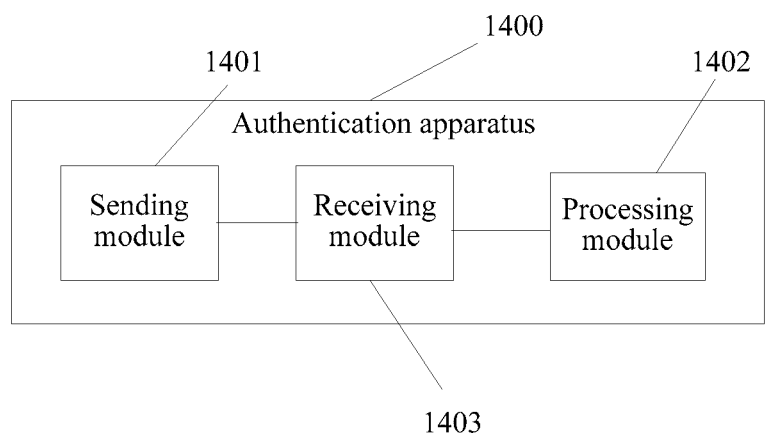
FIG. 14 is a structural block diagram of another authentication device according to an embodiment of the present invention.

FIG. 14 is a structural block diagram of an authentication apparatus according to an embodiment of the present invention. Referring to FIG. 14, the authentication apparatus 1400 includes a sending module 1401, a receiving module 1402, and a processing module 1403.

The receiving module 1402 is configured to receive a first random parameter from first user equipment.

The processing module 1403 is configured to: obtain a first user identifier, a second user identifier, and a second random parameter, generate a second authentication feature based on the first user identifier, the second user identifier, the first random parameter, and the second random parameter, and send the second authentication feature to the first user equipment.

The receiving module 1402 is further configured to receive a first authentication feature from the first user equipment.

The processing module 1403 is further configured to attempt to authenticate correctness of the first authentication feature.

In a case, the authentication feature is a message authentication code, and the sending module 1401 is configured to:

after the processing module 1403 generates a second MAC, send the first random parameter and the second random parameter to the first user equipment.

When the authentication feature is a message authentication code, the processing module 1403 is specifically configured to:

generate a communication shared key (K_com) and/or a session key (K_session) based on the first user identifier and the second user identifier; and generate the second MAC based on the communication shared key (K_com) or the session key (K_session), the first random parameter, and the second random parameter, where K_com=H (e(xH(ID1), H(ID2))^{H (parameter 1)}), where the parameter 1 may be at least one of a service identifier, a slice identifier, a link identifier, a connection identifier, a session identifier, a serving network identifier, a public land mobile network identifier, the first user identifier, and the second user identifier, and the H( ) algorithm is a Hash( ) algorithm or an HMAC( ) algorithm;

K_session=KDF (K_com, (at least one of session identifier, first random parameter, second random parameter, service identifier, first user identifier, and second user identifier)); and the second MAC=MAC (K_com or K_session, (at least one of first random parameter and second random parameter), (at least one of session identifier, first user identifier, second user identifier, service identifier, slice identifier, link identifier, connection identifier, serving network identifier, and public land mobile network identifier)), where the session identifier, the service identifier, the slice identifier, the link identifier, the connection identifier, the serving network identifier, and the public land mobile network identifier are obtained by the second user equipment in advance or received from the first user equipment.

In a case, the authentication feature is a ciphertext, and the processing module 1403 is specifically configured to:

encrypt the first user identifier, the second user identifier, the first random parameter, and the second random parameter by using the first user identifier, the communication shared key (K_com), or the session key (K_session), to generate a second ciphertext; and the attempting to authenticate correctness of the first authentication feature includes:

decrypt the first ciphertext by using the first subscriber key, the communication shared key (K_com), or the session key (K_session), to obtain a second random parameter, and determining whether the second random parameter obtained by decryption is the same as the previously encrypted second random parameter, where if the second random parameter obtained by decryption is the same as the previously encrypted second random parameter, authentication succeeds, where K_com=e(xH(ID1), H(ID2)), K_com=H (e(xH(ID1), H(ID2)), or K_com=H (e(xH(ID1), H(ID2))^{H (parameter 1)}), where the parameter 1 may be at least one of a service identifier, a slice identifier, a link identifier, a connection identifier, a session identifier, a serving network identifier, a public land mobile network identifier, the first user identifier, and the second user identifier, and the H( ) algorithm is a Hash( ) algorithm or an HMAC( ) algorithm; and K_session=KDF (K_com, (at least one of session identifier, first random parameter, second random parameter, service identifier, first user identifier, and second user identifier)).

In a case, the authentication feature is a digital signature;
the processing module 1403 is specifically configured to: generate a second digital signature in the following manner:

the second digital signature=Sign (SK_ID2, (at least one of first random parameter and second random parameter), (at least one of session identifier, first user identifier, second user identifier, service identifier, slice identifier, link identifier, connection identifier, serving network identifier, and public land mobile network identifier)); and after the processing module 1403 generates the second digital signature, the sending module 1401 is configured to: send the first random parameter and the second random parameter to the first user equipment.

In the authentication apparatus provided in this embodiment of the present invention, authentication is performed between two terminal devices by using a MAC, a ciphertext, or a digital signature, and in an authentication process, participation of an HSS is not required, so that an authentication flexibility requirement of a service can be satisfied.

Figure 15:
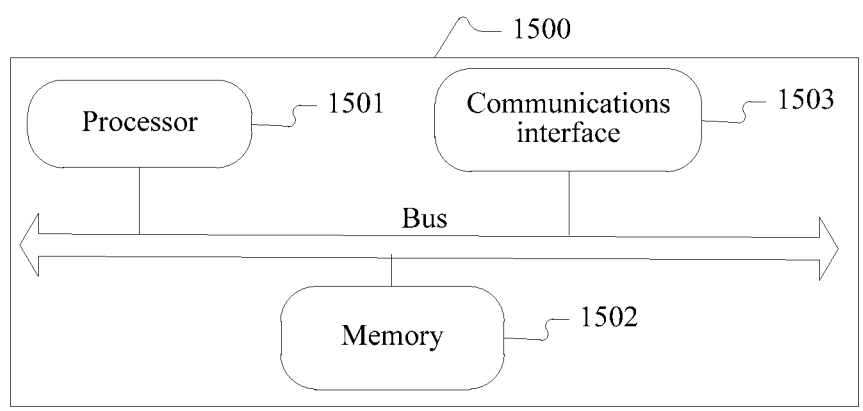
FIG. 15 is a schematic structural diagram of a terminal according to an embodiment of the present invention.

FIG. 15 is a schematic structural diagram of a terminal device according to an embodiment of the present invention. Referring to FIG. 15, the terminal 1500 provided in this embodiment of the present invention may include: at least one processor 1501, a memory 1502, a communications interface 1503, and a bus. The processor 1501, the memory 1502, and the communications interface 1503 are connected to and communicate with each other by using the bus. The bus may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 15, but this does not mean that there is only one bus or only one type of bus.

The memory 1502 is configured to store executable program code, where the program code includes a computer operation instruction. The memory 1502 may be a high-speed RAM memory, or a non-volatile memory, such as at least one disk memory.

The processor 1501 reads the executable program code stored by the memory 1502, to run a program corresponding to the executable program code to:

send a first random parameter to second user equipment;
receive a second authentication feature from the second user equipment; and
attempt to authenticate correctness of the second authentication feature, generate a first authentication feature, and send the first authentication feature to the second user equipment.

In a case, the authentication feature is a message authentication code MAC, and the processor 1501 reads the executable program code stored by the memory 1502, to run a program corresponding to the executable program code to:

before the first authentication feature is generated, receive the first random parameter and the second random parameter from the second user equipment; and obtain the first user identifier and the second user identifier, and generate a communication shared key (K_com) and/or a session key (K_session) based on the first user identifier and the second user identifier; and generate a first MAC based on the communication shared key (K_com) or the session key (K_session), the first random parameter, and the second random parameter, where K_com=H (e(xH(ID1), H(ID2))^{H (parameter 1)}), where the parameter 1 may be at least one of a service identifier, a slice identifier, a link identifier, a connection identifier, a session identifier, a serving network identifier, a public land mobile network identifier, the first user identifier, and the second user identifier, and the H( ) algorithm is a Hash( ) algorithm or an HMAC( ) algorithm;

K_session=KDF (K_com, (at least one of session identifier, first random parameter, second random parameter, service identifier, first user identifier, and second user identifier)); and the first MAC=MAC (K_com or K_session, (at least one of first random parameter and second random parameter), (at least one of session identifier, first user identifier, second user identifier, service identifier, slice identifier, link identifier, connection identifier, serving network identifier, and public land mobile network identifier)), where the session identifier, the service identifier, the slice identifier, the link identifier, the connection identifier, the serving network identifier, and the public land mobile network identifier are obtained by the first user equipment in advance or received from the second user equipment.

In another case, the authentication feature is a ciphertext, and the processor 1501 reads the executable program code stored by the memory 1502, to run a program corresponding to the executable program code to:

decrypt a second ciphertext by using a first subscriber key, a communication shared key (K_com), or a session key (K_session), to obtain a first random parameter and a second random parameter, and determining whether the first random parameter obtained by decryption is the same as the first random parameter previously sent to the second user equipment, where if the first random parameter obtained by decryption is the same as the first random parameter previously sent to the second user equipment, authentication succeeds, where K_com=e(xH(ID1), H(ID2)), K_com=H (e(xH(ID1), H(ID2)), or K_com=H (e(xH(ID1), H(ID2))^{H (parameter 1)}), where the parameter 1 may be at least one of a service identifier, a slice identifier, a link identifier, a connection identifier, a session identifier, a serving network identifier, a public land mobile network identifier, the first user identifier, and the second user identifier, and the H( ) algorithm is a Hash( ) algorithm or an HMAC( ) algorithm; and K_session=KDF (K_com, (at least one of session identifier, first random parameter, second random parameter, service identifier, first user identifier, and second user identifier)).

When the authentication feature is a ciphertext, the processor 1501 reads the executable program code to: obtain the first user identifier and the second user identifier, and encrypt the first user identifier, the second user identifier, and the second random parameter by using the first user identifier, the communication shared key (K_com), or the session key K_session, to generate a first ciphertext.

In another case, the authentication feature is a digital signature, and the processor 1501 reads the executable program code stored by the memory 1502, to run a program corresponding to the executable program code to: before the first authentication feature is generated, receive the first random parameter and the second random parameter from the second user equipment; and calculate a first digital signature based on the first random parameter, the second random parameter, and a first subscriber key, where the first digital signature=Sign (SK_ID1, (at least one of first random parameter and second random parameter), (at least one of session identifier, first user identifier, second user identifier, service identifier, slice identifier, link identifier, connection identifier, serving network identifier, and public land mobile network identifier)), where the session identifier, the service identifier, the slice identifier, the link identifier, the connection identifier, the serving network identifier, and the public land mobile network identifier are obtained by the second user equipment in advance or received from the first user equipment.

In the terminal provided in this embodiment of the present invention, authentication is performed between two terminal devices by using a MAC, a ciphertext, or a digital signature, and in an authentication process, participation of an HSS is not required, so that an authentication flexibility requirement of a service can be satisfied.

Figure 16:
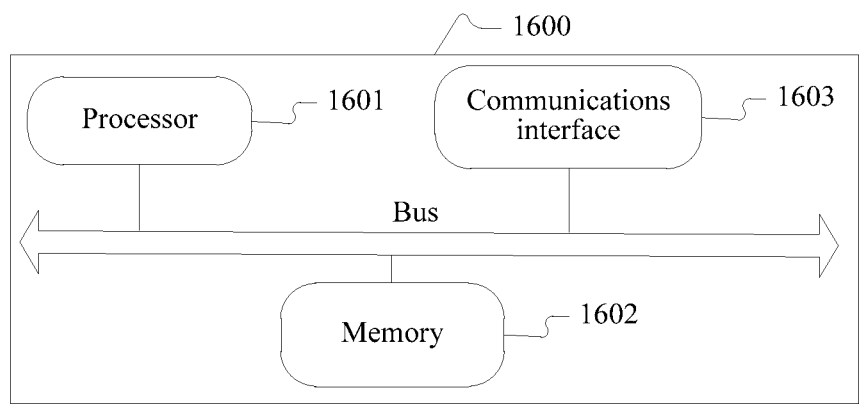
FIG. 16 is a schematic structural diagram of a terminal according to an embodiment of the present invention.

FIG. 16 is a schematic structural diagram of a terminal device according to an embodiment of the present invention. Referring to FIG. 16, the terminal 1600 provided in this embodiment of the present invention may include: at least one processor 1601, a memory 1602, a communications interface 1603, and a bus. The processor 1601, the memory 1602, and the communications interface 1603 are connected to and communicate with each other by using the bus. The bus may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 16, but this does not mean that there is only one bus or only one type of bus.

The memory 1602 is configured to store executable program code, where the program code includes a computer operation instruction. The memory 1602 may be a high-speed RAM memory, or a non-volatile memory, such as at least one disk memory.

The processor 1601 reads the executable program code stored by the memory 1602 to run a program corresponding to the executable program code to:

receive a first random parameter from first user equipment;

obtain a first user identifier, a second user identifier, and a second random parameter, generate a second authentication feature based on the first user identifier, the second user identifier, the first random parameter, and the second random parameter, and send the second authentication feature to the first user equipment;

receive a first authentication feature from the first user equipment; and attempt to authenticate correctness of the first authentication feature.

In a case, the authentication feature is a message authentication code (MAC), and the processor 1601 reads the executable program code stored by the memory 1602 to run a program corresponding to the executable program code to:

generate a communication shared key (K_com) and/or a session key (K_session) based on the first user identifier and the second user identifier; and generate the second MAC based on the communication shared key (K_com) or the session key (K_session), the first random parameter, and the second random parameter, where K_com=H (e(xH(ID1), H(ID2))^{H (parameter 1)}), where the parameter 1 may be at least one of a service identifier, a slice identifier, a link identifier, a connection identifier, a session identifier, a serving network identifier, a public land mobile network identifier, the first user identifier, and the second user identifier, and the H( ) algorithm is a Hash( ) algorithm or an HMAC( ) algorithm;

K_session=KDF (K_com, (at least one of session identifier, first random parameter, second random parameter, service identifier, first user identifier, and second user identifier)); and the second MAC=MAC (K_com or K_session, (at least one of first random parameter and second random parameter), (at least one of session identifier, first user identifier, second user identifier, service identifier, slice identifier, link identifier, connection identifier, serving network identifier, and public land mobile network identifier)), where the session identifier, the service identifier, the slice identifier, the link identifier, the connection identifier, the serving network identifier, and the public land mobile network identifier are obtained by the second user equipment in advance or received from the first user equipment.

After the second MAC is generated, the first random parameter and the second random parameter may be sent to the first user equipment.

In another case, the authentication feature is a ciphertext, and the processor 1601 reads the executable program code stored by the memory 1602 to run a program corresponding to the executable program code to:

encrypt the first user identifier, the second user identifier, the first random parameter, and the second random parameter by using the first user identifier, a communication shared key (K_com), or a session key (K_session), to generate a second ciphertext; and decrypt a first ciphertext by using a first subscriber key, the communication shared key (K_com), or the session key (K_session), to obtain a second random parameter, and determining whether the second random parameter obtained by decryption is the same as the previously encrypted second random parameter, where if the second random parameter obtained by decryption is the same as the previously encrypted second random parameter, authentication succeeds, where K_com=e(xH(ID1), H(ID2)), K_com=H (e(xH(ID1), H(ID2)), or K_com=H (e(xH(ID1), H(ID2))^{H (parameter 1)}), where the parameter 1 may be at least one of a service identifier, a slice identifier, a link identifier, a connection identifier, a session identifier, a serving network identifier, a public land mobile network identifier, the first user identifier, and the second user identifier, and the H( ) algorithm is a Hash( ) algorithm or an HMAC( ) algorithm; and K_session=KDF (K_com, (at least one of session identifier, first random parameter, second random parameter, service identifier, first user identifier, and second user identifier)).

In another case, the authentication feature is a digital signature, and the processor 1601 reads the executable program code stored by the memory 1602 to run a program corresponding to the executable program code to:

a second digital signature=Sign (SK_ID2, (at least one of first random parameter and second random parameter), (at least one of session identifier, first user identifier, second user identifier, service identifier, slice identifier, link identifier, connection identifier, serving network identifier, and public land mobile network identifier)); and after the second digital signature is generated, send the first random parameter and the second random parameter to the first user equipment.

In the terminal provided in this embodiment of the present invention, authentication is performed between two terminal devices by using a MAC, a ciphertext, or a digital signature, and in an authentication process, participation of an HSS is not required, so that an authentication flexibility requirement of a service can be satisfied.

It should be noted that an authentication system provided in the embodiments of the present invention may include the terminal shown in FIG. 15 and the terminal shown in FIG. 16. The terminals shown in FIG. 15 and FIG. 16 may be the user equipments described in the foregoing. For related content of the embodiment of the terminal and the embodiment of the authentication method, refer to each other.

It should be noted that an example in which the authentication apparatus provided in the foregoing embodiment includes only the foregoing modules is used for description. In an actual application, one or more modules may be added or reduced based on a requirement, to perform some or all functions described above. In addition, the embodiments of the authentication apparatus and the authentication method provided in the foregoing embodiments belong to a same idea, and for specific implementation processes thereof, refer to the method embodiment. Details are not described herein again.

It should be noted that the embodiments in this specification are all described in a progressive manner, each embodiment focuses on a difference from other embodiments, and for same or similar parts in the embodiments, reference may be made to these embodiments. An apparatus embodiment is basically similar to a method embodiment, and therefore is described briefly. For related parts, reference may be made to partial descriptions in the method embodiment.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the presence of additional identical elements in the process, method, article, or device that includes the element.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely example embodiments of the present invention, but are not intended to limit the present invention. Any modification, equivalent replacement, and improvement made without departing from the spirit and principle of the present invention shall fall within the protection scope of the present invention.

What is claimed is:

1. An authentication method carried out by a communications network element, the method comprising:

receiving a request from a user equipment (UE), wherein the request comprises a first identifier that is an international mobile subscriber identity (IMSI);

sending, in accordance with the request, the first identifier to a home subscriber server;

receiving an authentication vector from the home subscriber server, wherein the authentication vector comprises:

an authentication random number (RAND), a first response value (XRES), and an authentication value (AUTN);

sending the RAND and the AUTN to the UE;

receiving a second response value (RES) from the UE;

determining that the RES and the XRES are the same;

sending, in response to determining that the RES and the XRES are the same, a second identifier to a key management center (KMS);

receiving, from the KMS in response to sending the second identifier, a subscriber private key corresponding to the second identifier; and sending, by the communications network element, subscriber private key to the UE.

2. The authentication method according to claim 1, wherein the subscriber private key is generated using the second identifier.

3. The authentication method according to claim 1, wherein the subscriber private key is generated using an operator identifier and the second identifier.

4. The authentication method according to claim 1, wherein the request comprises the second identifier; and wherein the second identifier comprises any identifier taken from the group consisting of:

an industry user identifier, a service identifier, a company identifier, and an identifier of an individual user.

5. The authentication method according to claim 1, wherein the request comprises an indicator of a request to obtain the subscriber private key corresponding to the second identifier.

6. The authentication method according to claim 1, wherein the method further comprises:

sending, by the communications network element, a global public key to the UE.

7. An authentication method carried out by a user equipment (UE), the method comprising:

sending a request to a communications network element; wherein the request comprises a first identifier and a second identifier, wherein the first identifier is an international mobile subscriber identity (IMSI), and wherein the second identifier is an identifier taken from the group consisting of:

an industry user identifier, a service identifier, a company identifier, and an identifier of an individual user;

receiving, in accordance with the sending, an authentication random number (RAND) and an authentication value (AUTN);

authenticating the AUTN;

calculating, after authenticating the AUTN, a second response value (RES) that is provided by the UE to the communication network as a response to receiving the RAND and AUTN from the communications network element; and receiving, from the communications network element, a subscriber private key corresponding to the second identifier.

8. The authentication method according to claim 7, wherein the subscriber private key is generated by using an operator identifier and the second identifier.

9. The authentication method according to claim 7, wherein the request comprises an indicator of a request to obtain the subscriber private key corresponding to the second identifier.

10. The authentication method according to claim 7, wherein the method further comprises:

receiving a global public key from the communications network element.

11. A communications network element, wherein the system comprises:

a processor; and a non-transitory computer-readable medium including computer-executable instructions that, when executed by the processor, facilitate the communications network element carrying out an authentication method comprising:

receiving a request from a user equipment (UE), wherein the request comprises a first identifier that is an international mobile subscriber identity (IMSI);

sending, in accordance with the request, the first identifier to a home subscriber server;

receiving an authentication vector from the home subscriber server, wherein the authentication vector comprises:
an authentication random number (RAND),
a first response value (XRES), and
an authentication value (AUTN);

sending the RAND and the AUTN to the UE;

receiving a second response value (RES) from the UE;

determining that the RES and the XRES are the same;

sending, in response to determining that the RES and the XRES are the same, a second identifier to a key management center (KMS);

receiving, from the KMS in response to sending the second identifier, a subscriber private key corresponding to the second identifier; and sending, by the communications network element, subscriber private key to the UE.

12. The communications network element according to claim 11, wherein the subscriber private key is generated by using the second identifier.

13. The communications network element according to claim 11, wherein the subscriber private key is generated by using an operator identifier and the second identifier.

14. The communications network element according to claim 11, wherein the request comprises the second identifier; and wherein the second identifier comprises any identifier taken from the group consisting of:

an industry user identifier, a service identifier, a company identifier, and an identifier of an individual user.

15. The communications network element according to claim 11, wherein the request comprises an indicator of a request to obtain the subscriber private key corresponding to the second identifier.

16. The communications network element according to claim 11, wherein the method further comprises sending a global public key to the UE.

17. A user equipment (UE), comprising:

a processor; and a non-transitory computer-readable medium including computer-executable instructions that, when executed by the processor, facilitate the processor carrying out a method comprising:

sending a request to a communications network element; wherein the request comprises a first identifier and a second identifier; wherein the first identifier is an international mobile subscriber identity (IMSI); wherein the second identifier is an identifier taken from the group consisting of:

an industry user identifier, a service identifier, a company identifier, and an identifier of an individual user;

receiving, in accordance with the sending, an authentication random number (RAND) and an authentication value (AUTN);

authenticating the AUTN;

calculating, after authenticating the AUTN, a second response value (RES) that is provided by the UE to the communication network as a response to receiving the RAND and AUTN from the communications network element; and receiving, from the communications network element, a subscriber private key corresponding to the second identifier.

18. The UE according to claim 17, wherein the subscriber private key is generated by using an operator identifier and the second identifier.

19. The UE according to claim 17, wherein the request comprises an indicator of a request to obtain the subscriber private key corresponding to the second identifier.

20. The UE according to claim 17, wherein the method further comprises:

receiving a global public key from the communications network element.

* * * * *